United States Patent
Otomo

(10) Patent No.: US 6,341,947 B1
(45) Date of Patent: Jan. 29, 2002

(54) PUMP DEVICE WHEREIN DETECTION OF FAILURE OF ONE OF PUMPS CAUSES A CHANGE IN THE MANNER OF CONTROL OF THE PUMP OR PUMPS TO COMPENSATE FOR THE FAILURE

(75) Inventor: Akihiro Otomo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/517,581

(22) Filed: Mar. 2, 2000

(30) Foreign Application Priority Data

Mar. 26, 1999 (JP) .......................................... 11-082864

(51) Int. Cl.[7] .............................................. F04B 49/00
(52) U.S. Cl. .......................................... 417/286; 303/11
(58) Field of Search ........................... 303/10, 11, 155; 417/286, 279, 287, 300

(56) References Cited

U.S. PATENT DOCUMENTS

| 4,736,992 A | * | 4/1988 | Hendrickson | 303/92 |
|---|---|---|---|---|
| 4,817,767 A | | 4/1989 | Seibert et al. | |
| 4,824,183 A | * | 4/1989 | Uchida et al. | 303/92 |
| 5,492,395 A | * | 2/1996 | Naruse et al. | 303/122.12 |
| 5,588,718 A | | 12/1996 | Winner et al. | |
| 5,741,050 A | * | 4/1998 | Ganzel et al. | 303/10 |
| 5,951,118 A | * | 9/1999 | Soejima | 303/113.1 |
| 5,951,120 A | | 9/1999 | Shimura et al. | 309/122.05 |
| 5,979,997 A | | 11/1999 | Ohkubo et al. | 303/122.09 |
| 6,076,897 A | | 6/2000 | Binder et al. | |
| 6,126,248 A | | 10/2000 | Kawahata et al. | |
| 6,158,825 A | | 12/2000 | Schunck et al. | |

FOREIGN PATENT DOCUMENTS

| JP | A-9-256960 | 9/1997 |
|---|---|---|
| JP | A-10-16752 | 1/1998 |
| JP | A-10-35466 | 2/1998 |
| JP | A-10-86804 | 4/1998 |
| JP | A-10-100884 | 4/1998 |
| JP | A-11-500982 | 1/1999 |

* cited by examiner

Primary Examiner—Teresa Walberg
Assistant Examiner—Thor Campbell
(74) Attorney, Agent, or Firm—Oliff & Berridge PLC

(57) ABSTRACT

A pump device including a plurality of pumps having respective different operating characteristics, and a pump control device for controlling the plurality of pumps, wherein the pump control device includes a control changing portion operable in response to detection of a failure of at least one of the pumps, for changing a manner of controlling at least one of the other of the pumps such that at least a portion of the operating characteristic of each defective pump is compensated for by the changed manner of controlling each normal pump. The pump device may be used in a hydraulic pressure control system as used for a hydraulically operated braking system for an automotive vehicle.

23 Claims, 9 Drawing Sheets

PUMP DEVICE WHEREIN DETECTION OF FAILURE OF ONE OF PUMPS CAUSES A CHANGE IN THE MANNER OF CONTROL OF THE PUMP OR PUMPS TO COMPENSATE FOR THE FAILURE

This application is based on Japanese Patent Application No. 11-82864 filed Mar. 26, 1999, the content of which is incorporated hereinto by reference.

BACKGROUND OF THE INVENTION

1. Field of the Invention

The present invention relates in general to a pump device having a plurality of pumps having different operating characteristics, and a hydraulic pressure control system including such a pump device, and more particularly to techniques for dealing with an operating failure of the pumps.

2. Discussion of the Related Art

A pump device of the type described above is disclosed in JP-A-9-256960. This pump device includes not only a plurality of pumps as indicated above, but also a pump control device for controlling those pumps, and a high-pressure pump and a low-pressure pump. The high-pressure pump has a highest delivery pressure which is higher than that of the low-pressure pump, and a highest delivery flow rate which is lower than that of the low-pressure pump. The pump device is provided in a braking system for an automotive vehicle, for delivering the pressurized fluid to wheel brake cylinders. The high-pressure and low-pressure pumps are selectively activated depending upon the desired fluid pressure to be applied to the wheel brake cylinders. When the desired pressure of a given one of the wheel brake cylinders is lower than a predetermined first threshold value, the low-pressure and high-pressure pumps are both activated. When the desired wheel brake cylinder pressure is between the predetermined first threshold value and a predetermined second threshold value larger than the first threshold value, only the low-pressure pump is activated. When the desired wheel brake cylinder pressure is higher than the second threshold value, only the high-pressure pump is activated. This selection of the pumps is based on a fact that a relatively large amount of the pressurized fluid should be the wheel brake cylinder for an initial period of a braking action of a hydraulic brake including the wheel brake cylinder, that is, until the hydraulic brake begins to provide a braking effect with respect to the corresponding vehicle wheel, while a relatively small amount of supply of the pressurized fluid to the wheel brake cylinder is required after the hydraulic brake has begun to provide the braking effect, that is, after the fluid pressure in the wheel brake cylinder has been raised to a relatively high level. Thus, the high-pressure pump and the low-pressure pumps are selectively used depending upon the required amount of supply of the fluid to be supplied to the wheel brake cylinder.

In the event of an operating failure of either one of those two pumps, the wheel brake cylinder pressure cannot be controlled to the desired value, or the amount of supply of the pressurized fluid to the wheel brake cylinder is insufficient, leading to deteriorated response in the control of the wheel brake cylinder pressure.

SUMMARY OF THE INVENTION

It is therefore a first object of the present invention to provide a pump device which includes a plurality of pumps having different operating characteristics and which is less likely to suffer from problems caused by an operating failure of some of the pumps.

A second object of this invention is to provide a hydraulic pressure control system including such a pump device.

The first or second object of this invention may be achieved according to any one of the following modes of the invention, each of which is numbered like the appended claims and depends from the other mode or modes, where appropriate, so as to indicate and clarify possible combinations of elements or technical features. It is to be understood that the present invention is not limited to the technical features or any combinations thereof which will be described for illustrative purpose only.

(1) A pump device (32) including a plurality of pumps having respective different operating characteristics, and a pump control device for controlling the plurality of pumps, characterized in that the pump control device comprises a control changing portion operable in response to detection of a failure of at least one of the plurality of pumps, for changing a manner of controlling at least one of the other of the plurality of pumps such that at least a portion of the operating characteristic of each of the above-indicated at least one of the plurality of pumps is compensated for by the changed manner of controlling the above-indicated at least one of the other of the plurality of pumps.

The operating characteristic of each pump includes a delivery pressure, a delivery flow rate, a rate of change of the delivery pressure and a rate of change of the delivery flow rate. In the pump device according to the above mode, the operating characteristic of each of the two or more pumps which is defective or fails to normally function will not be entirely lost, since the manner of controlling at least one of the other of the pumps is changed from the nominal manner, so as to compensate for at least a portion of the operating characteristic of the defective pump. Accordingly, a problem caused by the failure of one of the pumps can be minimized.

(2) A pump device according to the above mode (1), wherein the pump control device further comprises a pump failure detecting device for detecting the failure of the above-indicated at least one of the plurality of pumps, and the control changing portion operates in response to detection of the failure by the pump failure detecting device.

For instance, the pump failure detecting device includes a pump pressure sensor for detecting a delivery pressure of the pump device, and is adapted to detect a failure of at least one of the pumps on the basis of an output of the pump pressure sensor. The pump failure detecting device may be adapted to check whether the delivery pressure of each pump is zero or lower than a predetermined value during an operation of the pump or whether the delivery pressure has not been increased to a predetermined value a predetermined time after the initiation of an operation of the pump. In this case, the pump failure detecting device determines that the pump fails to normally function, if the delivery pressure is zero or lower than the predetermined value during an operation of the pump, or if the delivery pressure has not been increased to the predetermined value after the pump has been operated for the predetermined time. Although a user of the pump device may manually activate the control changing portion when the user has detected a failure of a certain pump, the failure is automatically detected by the pump failure detecting device, and the control changing portion is automatically activated in response to the detection of the failure, in the pump device according to the above mode. This arrangement assures relatively high accuracy of detection of the pump failure.

(3) A pump device according to the above mode (1) or (2), wherein the pump control device further comprises a pump selecting portion operable when the plurality of pumps are normal, for selecting at least one of the plurality of pumps which should be operated, on the basis of at least one of a desired delivery pressure and a desired delivery flow rate of the pump device, and on the basis of information defining an operating range in which each of the plurality of pumps should be operated, which operating range is determined by a capacity of each pump, and wherein the control changing portion changes the operating range of each of the above-indicated at least one of the other of the plurality of pumps.

Although the plurality of pumps have mutually different characteristics, the operating ranges of the pumps usually partially overlap each other, so that the pump selecting portion is desirably adapted to select the pump or pumps to be operated, such that each selected pump is operable under a load more or less smaller than its nominal or maximum load value. Therefore, upon failure of at least one of the pumps, the operating range of at least one of the other of the pumps is changed by the control changing portion so that the at least one other normal pump is selected and operated, in place of the at least one defective pump, such that at least a portion of the operating characteristic of each defective pump is compensated for by the operated normal pump or pumps. Accordingly, the problem caused by the failure of one or more pumps can be minimized.

(4) A pump device according to the above mode (3), wherein the plurality of pumps include a low-pressure pump and a high-pressure pump having a maximum delivery pressure higher than that of the low-pressure pump, and the operating range of each of the low-pressure and high-pressure pumps is defined by a desired value of the delivery pressure of the pump device, and wherein the control changing portion comprises a low-pressure-pump upper limit increasing portion for increasing an upper limit of a delivery pressure of the low-pressure pump to thereby change the operating range of the low-pressure pump when the high-pressure pump becomes defective, such that the upper limit is higher while the high-pressure pump is defective than while the high-pressure pump is not defective.

The low-pressure pump whose maximum delivery pressure is lower than that of the high-pressure pump is operated when the desired value of the delivery pressure of the pump device is relatively small, while the high-pressure pump is operated when the desired delivery pressure value of the pump device is relatively large. When the low-pressure pump and the high-pressure pump are both normally functioning, the upper limit of the range of the delivery pressure in which the low-pressure pump is permitted to be operated is lower than the maximum delivery pressure of the low-pressure pump. When the high-pressure pump is detected to be defective, the upper limit of the delivery pressure range in which the low-pressure is permitted to be operated is increased, so that the delivery pressure of the low-pressure pump can be made higher when the low-pressure pump is operated while the high-pressure pump is defective, than when the low-pressure pump is operated while the high-pressure pump is not defective. Accordingly, the delivery pressure obtained by the normally functioning high-pressure pump may be obtained by operation of the low-pressure pump when the high-pressure pump is defective.

(5) A pump device according to the above mode (4), wherein the pump control device commands the low-pressure pump to be held operated even in the absence of a command to increase a delivery pressure of the pump device while the high-pressure pump is normal, the pump control device further comprising a low-pressure turning-off portion operable when the high-pressure pump becomes defective, for turning off the low-pressure pump in the absence of the command, at least when the desired value of the delivery pressure of the pump device is in a range between two values of the upper limit of the delivery pressure of the low-pressure pump before and after the upper limit has been increased by the low-pressure-pump upper limit increasing portion.

Since the delivery pressure of the low-pressure pump is relatively low while the high-pressure pump is normal, the load acting on the low-pressure pump will not be excessively large even if the low-pressure pump is operated in the absence of a command to increase the delivery pressure of the pump device while the high-pressure pump is normal. In view of this, the pump device according to the above mode (5) is arranged such that the low-pressure pump is held operated even in the absence of such a command while the high-pressure pump is normal. This arrangement is effective to improve the operating response of the low-pressure pump when it is required to be operated in response to a command to increase the delivery pressure of the pump device. While the high-pressure pump is defective, on the other hand, the load acting on the low-pressure pump may be excessively large since the upper limit of the delivery pressure of the low-pressure pump is increased. Accordingly, the pump device according to the above mode (5) is arranged to hold the low-pressure pump off as long as a command to increase the delivery pressure of the pump device is absent while the high-pressure pump is defective. This arrangement is effective to reduce the load on the low-pressure pump, and prolong the expected life expectancy of the low-pressure pump.

(6) A pump device according to any one of the above modes (1)–(5), wherein the plurality of pumps include a low-pressure pump and a high-pressure pump having a maximum delivery pressure higher than that of the low-pressure pump, and the pump control device further comprises a low-pressure-pump drive force controlling portion for controlling a drive force of the low-pressure pump to a value corresponding to a desired value of a delivery pressure of the pump device, and high-pressure-pump on/off controlling portion for selectively turning on and of f the high-pressure pump.

The low-pressure pump is controlled such that the delivery pressure of the low-pressure pump is equal to the desired value of the delivery pressure of the pump device, so that the delivery pressure of the pump device is controlled to be the desired value. On the other hand, the high-pressure pump is selectively turned on and off, irrespective of the desired value of the delivery pressure of the pump device, so that the delivery pressure of the pump device is different from the desired value. Generally, the on/off control of a pump is easier than the control of its drive force so as to establish a particular delivery pressure. That is, the high-pressure-pump on/off controlling portion may be simpler than the low-pressure-pump drive force controlling portion. The high-pressure pump may be kept operated if it is connected to a pressure relief valve so that the fluid pressurized by the continuously operated high-pressure pump is discharged through the pressure relief valve when the delivery pressure of the high-pressure pump has been raised to a predetermined upper limit. However, this arrangement causes wasting of an electric energy due to the continuous operation of the high-pressure pump. In this respect, the on/off control of the high-pressure pump according to the above mode (6) is advantageous since the pressure relief valve is not necessary. Where the on/off control is adopted together with the pressure relief valve, the required amount of electric energy for driving the high-pressure pump is reduced by turning off the high-pressure pump before the pressure relief valve is opened.

(7) A pump device according to any one of the above modes (1)–(5), wherein the plurality of pumps include a low-pressure pump and a high-pressure pump having a maximum delivery pressure higher than that of the low-pressure pump, and the pump control device further comprises a low-pressure-pump drive force controlling portion for controlling a drive force of the low-pressure pump to a value corresponding to a desired value of a delivery pressure of the pump device, and a low-pressure-pump-failure high-pressure pump controlling portion for controlling the high-pressure pump while the low-pressure pump is defective, so that a desired value of a delivery pressure of the pump device is available based on a delivery pressure of the high-pressure pump.

Even in the event of a failure of the low-pressure pump, the desired delivery pressure of the pump device is available based on the delivery pressure of the high-pressure pump which is operated in place of the defective low-pressure pump. Where the high-pressure pump is adapted to be selectively turned on and off and is connected to a buffer provided for storing a fluid pressurized by the high-pressure pump, as described below with respect to the above (13) of this invention, the low-pressure-pump-failure high-pressure pump controlling portion may be adapted to selectively turn on and off the high-pressure pump such that the fluid pressurized by the high-pressure pump is always stored in the buffer. Where such a buffer is not provided, the low-pressure-pump-failure high-pressure pump controlling portion may be adapted to hold the high-pressure pump in an operated state. Where a high-pressure-pump drive force controlling portion is provided for controlling the drive force of the high-pressure pump to a value corresponding to the desired value of the delivery pressure of the pump device, the high-pressure-pump drive force controlling portion may be adapted to control the drive force of the high-pressure pump such that the delivery pressure of the high-pressure pump is controlled to a predetermined value which is within a range of the delivery pressure of the low-pressure pump or which is equal to the lower limit of the range of the delivery pressure of the high-pressure pump.

In the pump device according to the above mode (7) wherein the high-pressure pump is controlled while the low-pressure pump is defective so that the fluid pressurized by the high-pressure pump is always available to obtain the desired delivery pressure of the pump device, the problem caused by the failure of the low-pressure pump can be minimized.

(8) A pump device according to any one of the above modes (1)–(7), wherein the plurality of pumps include a low-pressure pump and a high-pressure pump having a maximum delivery pressure higher than that of the low-pressure pump, and the pump control device further comprises a low-pressure-pump drive force controlling portion for controlling a drive force of the low-pressure pump to a value corresponding to a desired value of a delivery pressure of the pump device and a high-pressure-pump on/off controlling portion for selectively turning on and off the high-pressure pump, and the control changing portion comprises a low-pressure-pump-failure & normal-low-pressure-pump-driver high-pressure pump controlling portion for commanding the low-pressure-pump drive force controlling portion to control the drive force of the high-pressure pump for thereby causing the high-pressure pump to perform a function of the low-pressure pump when the low-reassure pump is defective while the low-pressure-pump drive force controlling portion is normal.

In the pump device according to the above mode (8), the low-pressure-pump-failure & normal-low-pressure-pump-driver high-pressure pump controlling portion commands the low-pressure-pump drive force controlling portion to control the drive force of the high-pressure pump so that the high-pressure pump performs a function of the low-pressure pump when the low-pressure pump is defective while the low-pressure-pump drive force controlling portion is normal, that is, so that the high-pressure pump is operated in place of the low-pressure pump, to establish the desired delivery pressure of the pump device. The high-pressure-pump on/off controlling portion is not arranged to control the drive force of the high-pressure pump to a value corresponding to the desired delivery pressure value of the pump device, but is arranged to control the high-pressure pump so that the delivery pressure of the high-pressure pump is controlled to a value different from the desired delivery pressure of the pump device. When the low-pressure pump is defective, the low-pressure-pump drive force controlling portion is activated, in place of the high-pressure-pump on/off controlling portion, to control the drive force of the high-pressure pump so that the delivery pressure of the high-pressure pump is controlled to the desired delivery pressure of the pump device. Thus, the high-pressure pump performs the function of the low-pressure pump when the low-pressure pump is defective. When the low-pressure-pump drive force controlling portion controls the drive force of the high-pressure pump, this controlling portion changes suitable control parameters for controlling the high-pressure pump, depending upon the operating characteristic of the high-pressure pump, such that the control parameters used for controlling the high-pressure pump are different from those used for controlling the low-pressure pump, even if the desired delivery pressure to be established is the same. For example, the control parameters include a coefficient used to determine an electric current to be applied to electric motor motors for driving the low-pressure and high-pressure pumps, on the basis of the desired delivery pressure.

The low-pressure or high-pressure pump fails to normally operate not only when the pump per se is defective but also when the controlling portion for controlling the pump is defective as indicated above with respect to the above mode (8), or when both of the pump and the controlling portion are defective.

(9) A hydraulic pressure control system including a pump device according to any one of the above modes (1)–(5) and (8), a hydraulically operated device and a pressure control valve device interconnected between the pump device and the hydraulically operated device and operable to control a delivery pressure of the pump device such that the controlled delivery pressure is applied to the hydraulically operated device.

In the hydraulic pressure control system according to the above mode (9) which includes the pump device according to the above mode (3), the desired delivery pressure and delivery flow rate of the pump device are the delivery pressure and flow rate of the pump device which are desired for operating the hydraulically operated device. At least one of the pumps of the pump device which should be operated is selected by the pump selecting portion of the pump device, on the basis of at least one of the desired delivery pressure and flow rates of the pump device, and on the basis of the information defining the operating ranges of the pumps.

(10) A hydraulic pressure control system according to the above mode (9), wherein the plurality of pumps include a low-pressure pump and a high-pressure pump having a maximum delivery pressure higher than that of the low-pressure pump, and the pump control device comprises (a) a pump selecting portion operable when the plurality of pumps are normal, for selecting at least one of the plurality of pumps which should be operated, on the basis of at least one of a desired delivery pressure and a desired delivery flow rate of the pump device, and on the basis of information defining an operating range in which each of the plurality of pumps should be operated, which operating range is determined by a capacity of the each pump, and (b) a low-pressure-pump drive force controlling portion for controlling a drive force of the low-pressure pump to a value corresponding to a desired value of the delivery pressure of the pump device, and wherein the control changing portion comprises a low-pressure-pump upper limit increasing portion for increasing an upper limit of a delivery pressure of the low-pressure pump to thereby change the operating range of the low-pressure pump when the high-pressure pump becomes defective, such that the upper limit is higher while the high-pressure pump is defective than while the high-pressure pump is not defective, the pump control device further comprising a high-pressure-pump failure pressure control valve controlling portion operable when the high-pressure pump becomes defective, for commanding the pressure control valve device to operate, in place of the low-pressure-pump drive force controlling portion, to control the delivery pressure of the low-pressure pump to be applied to the hydraulically operated device, at least when the desired value of the delivery pressure of the pup device is in a range between two values of the upper limit of the delivery pressure of the low-pressure pump before and after the upper limit has been increased by the low-pressure-pump upper limit increasing portion.

Before the upper limit of the delivery pressure of the low-pressure pump has been increased by the low-pressure-pump upper limit increasing portion, the drive force of the low-pressure pump can be controlled such that the pressure to be applied to the hydraulically operated device is controlled to the desired delivery pressure of the low-pressure pump, and therefore the pressure control valve device need not be controlled. After the upper limit of the delivery pressure of the low-pressure pump has been increased, however, the delivery pressure of the low-pressure pump cannot be accurately controlled by controlling the drive force of the low-pressure pump. Accordingly, after the upper limit of the delivery pressure of the low-pressure pump has been increased, the pressure control valve device rather than the low-pressure pump is controlled so that the pressure to be applied to the hydraulically operated device is controlled with higher accuracy. It is noted that after the upper limit of the delivery pressure of the low-pressure pump has been increased, the high-pressure-pump-failure pressure control valve controlling portion may command the pressure control valve to operate, in place of the low-pressure-pump drive force controlling portion, to control the delivery pressure of the low-pressure pump, even when the desired value of the delivery pressure of the low-pressure pump is lower than the normal upper limit (upper limit which has not been increased).

The pump control device may comprise, in addition to the pump selecting portion and the low-pressure-pump drive force controlling portion, a high-pressure-pump on/off controlling portion for selectively turning on and off the high-pressure pump, or a high-pressure-pump drive force controlling portion for controlling the drive force of the high-pressure pump to a value corresponding to a desired value of the delivery pressure of the pump device.

(11) A hydraulic pressure control system including a pump device according to the above mode (7), a hydraulically operated device and a pressure control valve device interconnected between the pump and device and the hydraulically operated device and operable to control a delivery pressure of said pump device such that the controlled delivery pressure is applied to the hydraulically operated device.

(12) A hydraulic pressure control system according to the above mode (11), wherein the pump control device further comprises a low-pressure-pump-failure pressure control valve controlling portion operable at least when the low-pressure-pump-failure high-pressure-pump controlling portion is in operation, for commanding the pressure control valve device to control the delivery pressure of the high-pressure pump to be applied to the hydraulically operated device.

For instance, the pump control device may include a high-pressure pump on/off controlling portion or a high-pressure-pump drive force controlling portion, for controlling the high-pressure pump. The high-pressure pump on/off controlling portion is adapted to selectively turn on and off the high-pressure pump. On the other hand, the high-pressure-pump drive force is adapted to control portion for controlling the drive force of the high-pressure pump to a value corresponding to the desired value of the delivery pressure of the pump device. In the case where the high-pressure pump on/off controlling portion is provided to control the high-pressure pump, the drive force of the high-pressure pump is not controlled depending upon the desired delivery pressure, but the high-pressure pump is selectively turned on and off such that the delivery pressure is held at a suitable value not determined by the desired value, while the delivery pressure of the high-pressure pump is controlled to the desired value by the pressure control valve device at least when the low-pressure pump is defective, so that the pressure to be applied to the hydraulically operated device is controlled to the desired value of the delivery pressure as obtained by the low-pressure-pump drive force controlling portion. In the latter case where the high-pressure-pump drive force controlling portion is provided to control the delivery pressure of the high-pressure pump, the accuracy of control of the delivery pressure of the high-pressure pump by the high-pressure-pump drive force controlling portion is comparatively low when the desired delivery pressure is lower than the normal upper limit of the low-pressure pump. In this case, therefore, the delivery pressure of the high-pressure pump is controlled by the pressure control valve device so that the delivery pressure is controlled to the desired value with high accuracy. The low-pressure-pump-failure pressure control valve controlling portion may be adapted such that the pressure which is normally applied to the hydraulically operated device from the low-pressure pump is applied from the pressure control valve device. Alternatively, the low-pressure-pump-failure pressure control valve controlling portion may be adapted such that the desired pressure is always applied from the pressure control valve device to the hydraulically operated device.

(13) A hydraulic pressure control system according to any one of the above modes (9)–(12), where the plurality of pumps include a low-pressure pump and a high-pressure pump having a maximum delivery pressure higher than that of the low-pressure pump, and the pump device includes a buffer connected to the high-pressure pump for accommodating a working fluid pressurized by the high-pressure pump.

The buffer used in the hydraulic pressure control system according to the above mode (13) has a volume which is smaller than an accumulator used in an ordinary hydraulic pressure control system and larger than a damper usually provided for reducing a delivery pressure pulsation of a pump. Usually, an accumulator has a volume enough to store an amount of pressurized working fluid sufficient to activate a hydraulically operated device a plurality of times, while a damper has a volume smaller than an amount of the working fluid delivered by one pumping action of the pump. The volume of the buffer in question is smaller than the amount of the working fluid required for performing a single operation of the hydraulically operated device, and is larger than the amount of the fluid delivered by one pumping action of the high-pressure pump.

Where the buffer is provided, the number of on/off operations of the high-pressure pump can be reduced. The pressurized fluid stored in the buffer permits the hydraulically operated device to be controlled as needed, without an operation of the high-pressure pump. Accordingly, the provision of the buffer results in an increase in the service life of the high-pressure pump.

The feature of the above form (13) of the invention is available independently of any one of the features of the above modes (1)–(12).

(14) A hydraulic pressure control system according to the above mode (13), wherein the high-pressure pump is of an internal fluid leakage type which permits the working fluid remaining in the buffer to be discharged due to an internal leakage of the working fluid through the internal fluid leakage type high-pressure pump after an operation of the hydraulically operated device.

The pressurized fluid which would remain in the buffer even after the operation of the hydraulically operated device may cause deterioration of the buffer and the related hydraulic piping due to the continued application of the pressure of the pressurized fluid in the buffer. In the hydraulic pressure control system according to the above mode (14) wherein the high-pressure pump is of an internal fluid leakage type, the pressurized fluid remaining in the buffer may be discharged through the high-pressure pump, so that the expected service life of the buffer may be prolonged. In addition, the hydraulic pressure control system does not require any special means for discharging the pressurized fluid from the buffer, and the system can be made relatively simple in construction.

(15) A hydraulic pressure control system according to the above mode (13) or (14), wherein the pump control device further comprises a buffer pressure controlling portion for turning off the high-pressure pump before the buffer is filled with the working fluid pressurized by the high-pressure pump, and turning on the high-pressure pump before the buffer has become empty.

In the hydraulic pressure control system according to the above mode (15), the buffer pressure controlling portion prevents filling of the buffer with the pressurized fluid, which would cause overloading of the high-pressure pump and its drive device, or cause opening of a pressure relief valve if disposed in parallel connection with the buffer. The buffer pressure controlling portion further prevents the buffer from becoming empty. If the buffer becomes empty, the rate of flow of the fluid to the hydraulically operated device is limited to the delivery flow rate of the high-pressure pump.

(16) A hydraulic pressure control system according to the above mode (15), wherein the buffer pressure controlling portion comprises high-pressure-pump turning-off portion for turning off the high-pressure pump when the pressure of the working fluid stored in the buffer as a result of an operation of the high-pressure pump has been increased to a predetermined upper threshold which is lower than a highest pressure of the working fluid that can be stored in the buffer.

(17) A hydraulic pressure control system according to the above mode (16), wherein the high-pressure-pump turning-off portion comprises a buffer upper-threshold-pressure detecting device for detecting that the pressure of the working fluid stored in the buffer has been increased to the predetermined upper threshold.

For instance, the buffer upper-threshold-pressure detecting device includes a pressure detecting device for detecting the pressure of the working fluid stored in the buffer. Where the buffer includes a housing, a piston movably received in the housing, and biasing means for biasing the piston, the buffer upper-threshold-pressure detecting device may include a piston position detecting device for detecting that the piston has been moved to a position at which the pressure of the fluid in the buffer is equal to the predetermined upper threshold.

(18) A hydraulic pressure control system according to any one of the above modes (15)–(17), wherein the buffer pressure controlling portion comprises a high-pressure-pump turning-on portion for turning on the high-pressure pump when the pressure of the working fluid stored in the buffer after the high-pressure pump is turned off has been reduced to a predetermined lower threshold which is higher than a lower limit pressure of the working fluid that can be stored in the buffer.

(19) A hydraulic pressure control system according to the above mode (18), wherein the high-pressure pump turning-on portion comprises a buffer lower-threshold-pressure detecting device for detecting that the pressure of the working fluid stored in the buffer has been reduced to the predetermined lower threshold.

(20) A hydraulic pressure control system according to any one of the above modes (13)–(19), wherein the pump device further includes a pressure relief valve connected to the high-pressure pump in parallel with the hydraulically operated device.

In the hydraulic pressure control system according to the above mode (20), the pressure relief valve is opened when the delivery flow rate of the high-pressure pump becomes higher than the rate of flow of the pressurized fluid to the hydraulically operated device where the buffer indicated above is not provided or where the buffer is filled with the pressurized fluid. Accordingly, the high-pressure pump and its drive device is prevented from being overloaded.

(21) A hydraulic pressure control system according to the above mode (20), wherein said pump control device includes a high-pressure-pump turning-off portion operable when said pressure relief valve is opened, for turning off said high-pressure pump.

The pressure relief valve is opened and the high-pressure pump is turned off when the delivery flow rate of the high-pressure pump becomes higher than the rate of low of the pressurized fluid to the hydraulically operated device where the buffer is not provided. Where the buffer is provided, the predetermined highest pressure of the fluid below which the fluid is stored in the buffer is usually lower than the relief pressure at which the pressure relief valve is opened. The high-pressure pump operated to store the pressurized fluid in the buffer is turned off when the pressure of the fluid in the buffer has been increased to the predetermined highest value. The high-pressure pump cannot be turned off in some cases in the event of a failure of the pressure sensor or the pump control device. In this cases, the pressure relief valve is opened. The opening of the pressure relief valve can be detected by detecting a movement of a valve member of the pressure relief valve, using a photoelectric sensor, or by detecting a sound of the working fluid flowing through the opened pressure relief valve, by using a microphone.

(22) A hydraulic pressure control system according to any one of the above modes (9)–(21), wherein said hydraulically operated device includes a hydraulically operated brake having a wheel brake cylinder which is hydraulically activated to brake a wheel of a vehicle.

In the hydraulic pressure control system according to the above mode (22), the desired value of the delivery pressure of the pump device is the desired pressure of the working fluid in the wheel brake cylinder. Where the pump device includes a low-pressure pump device and a high-pressure pump device, the low-pressure pump is operated when the desired value of the pressure in the wheel brake cylinder is relatively low, and the high-pressure pump is operated when the desired value of the wheel brake cylinder pressure is relatively high.

(23) A hydraulic pressure control system according to the above mode (22), wherein said buffer has a volume not larger than 10 cc.

The upper limit of the volume of the buffer indicated above is smaller than an amount of the working fluid required for activating four wheel brake cylinders for a braking operation with the nominal largest braking force of the hydraulic pressure control system in the form of a hydraulic barking system. The volume of the buffer may be 5 cc or smaller, or 3 cc or smaller.

BRIEF DESCRIPTION OF THE DRAWINGS

The above and optional objects, features, advantages and technical and industrial significance of the invention will be better understood and appreciated by reading the following detailed description of a presently preferred embodiment of the invention, when considered in connection with the accompanying drawings, in which.

DETAILED DESCRIPTION OF THE PREFERRED EMBODIMENT

Figure 1:
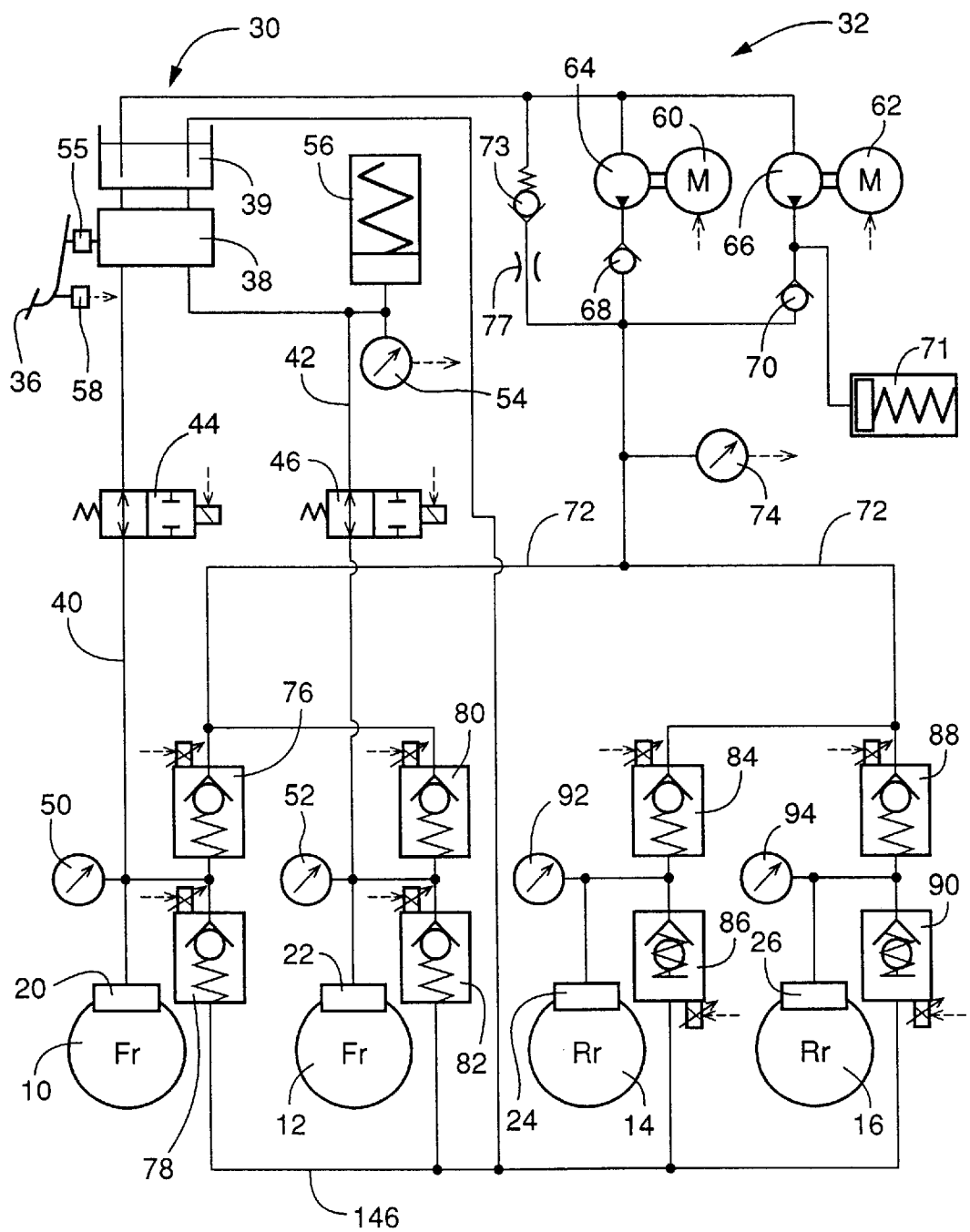
FIG. 1 is a hydraulic circuit diagram showing an automotive vehicle braking system equipped with a pump device and a hydraulic pressure control system according to one embodiment of this invention.

Referring to FIGS. 1–10, there will be described a braking system for an automotive vehicle, which is equipped with a pump device and a hydraulic pressure control system which are constructed according to one embodiment of this invention. Reference is first made to FIG. 1, wherein reference numerals 10 and 12 denote a front left wheel and a front right wheel, respectively, while reference numerals 14 and 16 denote a rear left wheel and a rear right wheel, respectively. The front wheels 10, 12 are provided with respective brakes having respective front wheel brake cylinders 20, 22, which are activated by a pressurized working fluid to apply braking torques to the front wheels 10, 12, for thereby braking the front wheels 10, 12. Similarly, the rear wheels 14, 16 are provided with respective brakes having respective rear wheel brake cylinders 24, 26. Each of the brakes provided for the wheels 10, 12, 14, 16 is a hydraulically operated device in the form of a hydraulic brake whose wheel brake cylinder 20, 22, 24, 26 is activated by the pressure of the working fluid supplied thereto. To the front wheel brake cylinders 20, 22, the pressurized fluid delivered from a manually operated hydraulic pressure source 30 or the pressurized fluid delivered from a pump device 32 is selectively supplied. To the rear wheel brake cylinders 24, 26, the pressurized fluid delivered from the pump device 32 is supplied.

The manually operated hydraulic pressure source 30 includes a master cylinder 38 which is adapted to pressurize the working fluid to a level corresponding to a brake operating force which is applied by a vehicle operator to a brake operating member in the form of a brake pedal 36. The master cylinder 38 is of a tandem type having two mutually independent pressurizing chambers which are partially defined by a pressurizing piston and in which the same fluid pressure is generated by an advancing movement of the pressurizing piston. To the master cylinder 38, there is connected a low-pressure hydraulic source in the form of a master reservoir 39. When the pressurizing piston of the master cylinder 39 is placed at its fully retracted position with the brake pedal 36 placed in its non-operated position, the two pressurizing chambers of the master cylinder 38 are held in communication with the master reservoir 39. When the pressurizing piston is advanced by a small distance from its fully retracted position, the pressurizing chambers are disconnected from the master reservoir 39. One of the two pressurizing chambers is connected through a fluid passage 40 to the wheel brake cylinder 20 for the front left wheel 10, while the other pressurizing chamber is connected through a fluid passage 42 to the wheel brake cylinder 22 for the front right wheel 12. The fluid passages 40, 42 are provided with respective master cylinder cut-off valves 44, 46, which are normally open solenoid-operated shut-off valves. The fluid pressures in portions of the fluid passages 40, 42 between the cut-off valves 44, 46 and the wheel brake cylinders 50, 52 are detected by respective wheel brake cylinder pressure sensors 50, 52, while the fluid pressure in the other portion of the fluid passage 42 between the cut-off valve 46 and the master cylinder 38 is detected by a master cylinder pressure sensor 54.

Between the brake pedal 36 and the master cylinder 36, there is provided a stroke simulator 55, Another stroke simulator 56 is connected to the portion of the fluid passage 42 between the master cylinder cut-off valve 46 and the master cylinder 38. Further, a stroke sensor 58 is provided to detect an operating stroke of the brake pedal 36. The stroke simulator 55 indicated above is a purely mechanical one which has a spring or other suitable elastic member whose elastic deformation permits a motion of the brake pedal 36 relative to the master cylinder 38. On the other hand, the stroke simulator 56 is adapted to accommodate the pressurized working fluid which is discharged from the corresponding one of the pressurizing chambers of the master cylinder 38 while the cut-off valves 44, 46 are closed. Thus, the stroke simulator 56 permits an operation of the brake pedal 36 even while the cut-off valves 44, 46 are closed. These two stroke simulators 55, 56 cooperate to function for giving the vehicle operator an operating feel of the brake pedal 36 which is similar to that in an ordinary braking system not equipped with the pump device 32.

The pump device 32 includes a low-pressure pump 64 and a high-pressure pump 66 which are driven by respective electric motors 60, 62. These low-pressure and high-pressure pumps 64, 66 are both gear pumps. The high-pressure pump 66 has a highest delivery pressure higher than that of the low-pressure pump 64, and a highest delivery flow rate lower than that of the low-pressure pump 64. For pressurizing the working fluid to a given level, therefore, the amount of an electric current required for driving the high-pressure pump 66 is smaller than that required for driving the low-pressure pump 44.

Figure 2:
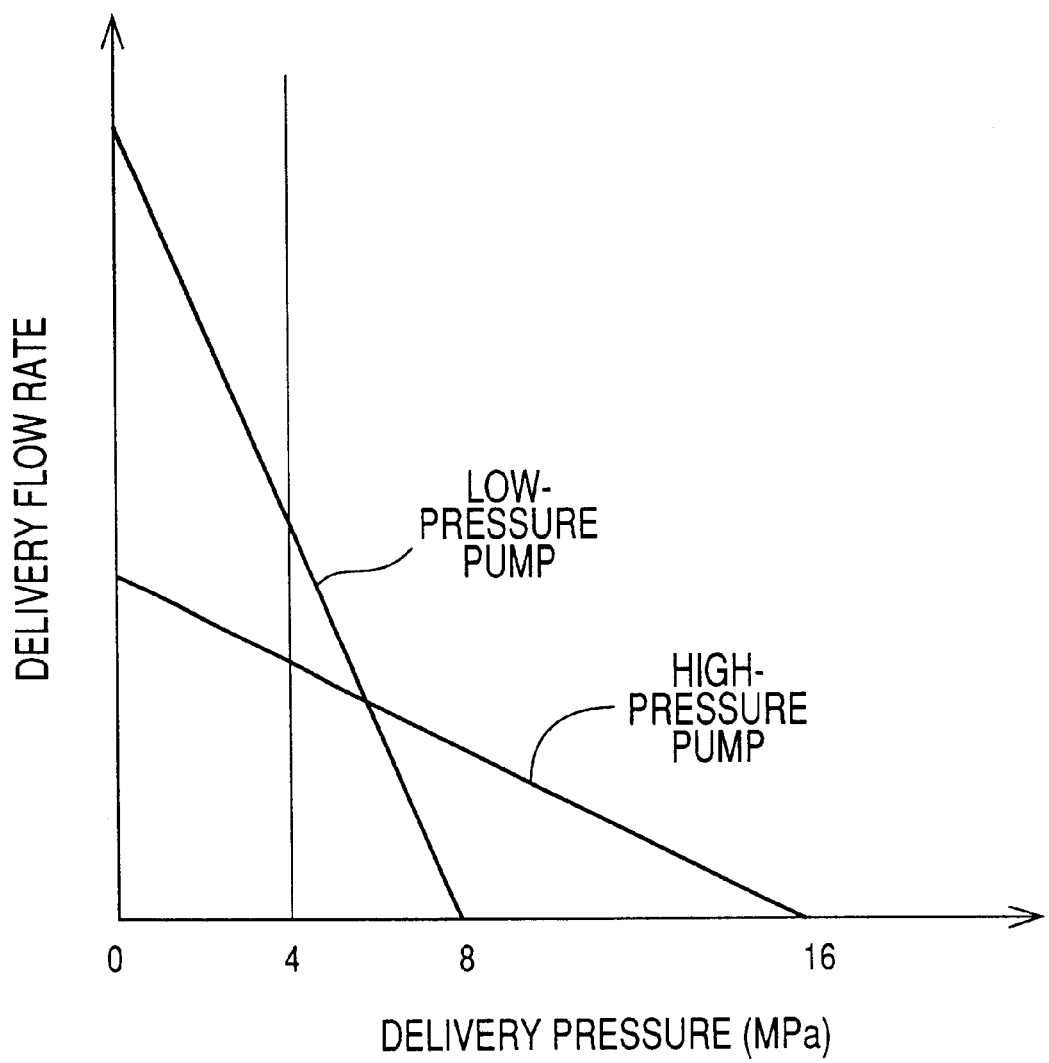
FIG. 2 is a graph indicating relationships between delivery pressure and delivery flow rate of low-pressure and high-pressure pumps of the pump device.

The graph of FIG. 2 shows operating characteristics of the low-pressure and high-pressure pumps 64, 66. The delivery pressure of the low-pressure pump 64 is variable in a range of 0–8 MPa, and its highest delivery flow rate is linearly reduced with an increase in the delivery pressure. By controlling the electric current to be applied to the electric motor 60, the delivery flow rate of the low-pressure pump 64 at each delivery pressure can be controlled as needed, in a range not higher than the highest value corresponding to that delivery pressure. The electric motor 62 for driving the high-pressure pump 66 is operated with a constant electric current, so that the delivery low rate of the high-pressure pump 66 is linearly reduced with an increase in its delivery pressure in a range of 0–16 MPa. In the present embodiment of the invention, the low-pressure pump 64 is operated when the desired delivery pressure of the pump device 32 is 4 MPa or lower, and the high-pressure pump 64 is operated when the desired delivery pressure is higher than 4MPa, as long as the two pumps 64, 66 are both normally functioning. Thus, the low-pressure and high-pressure pumps 64, 66 are selectively operated depending upon the desired delivery pressure of the pump device 32. It is noted that the pumps 64, 66 are capable of producing the fluid pressure higher than 8 MPa and 16 MPa, respectively, if the delivery flow rate need not be controlled. Data map representative of the operating characteristics of the pumps 64, 66 is stored in a ROM 176 of a pressure control computer 172 of a control device 170, which will be described.

Delivery flow passages connected to the delivery ports of the low-pressure and high-pressure pumps 64, 66 are connected to each other and to the wheel brake cylinders 20, 22, 24, 26 through fluid passages 72. Between the point of connection of the above-indicated delivery flow passages and the pumps 64, 66, there are provided respective check valves 68, 70. The check valve 68 functions to prevent a flow of the highly pressurized fluid delivered from the high-pressure pump 66 into the low-pressure pump 64, which flow would cause a leakage of the fluid from the low-pressure pump 64 which is a gear pump, and a reverse operation of the low-pressure pump 64 by the comparatively high fluid pressure delivered from the high-pressure pump 66. The provision of this check valve 68 eliminates a need of keep applying an electric current to the electric motor 60 so as to apply a holding torque to the low-pressure pump 64 so that the low-pressure pump 64 is prevented by the holding torque from being operated in the reverse direction by the pressurized fluid delivered from the high-pressure pump 66. On the other hand, the check valve 70 is provided to prevent a leakage of the fluid from the high-pressure pump 66 which is also a gear pump. The check valve 70 also functions to prevent a reverse operation of the high-pressure pump 66 by the pressurized fluid delivered from the low-pressure pump 64, which would cause the fluid to be returned to the master reservoir 39. The provision of the check valve 70 eliminates a need of keep applying an electric current to the electric motor 62 so as to apply a holding torque to the high-pressure pump 66 so that the high-pressure pump 66 is operated in the reverse direction, when the low-pressure pump 64 is in operation while the high-pressure pump 66 is not in operation.

To the delivery fluid passage of the high-pressure pump 66, there is connected a buffer 71 for accommodating the pressurized fluid delivered from the high-pressure pump 66. In the present embodiment, the buffer 71 is arranged such that the lower limit of the pressure of the fluid that can be accommodated in the buffer 71 is 10 MPa (hereinafter referred to as "lower pressure limit of the buffer 71"), while the upper limit of the same is 20 MPa (hereinafter referred to as "upper pressure limit of the buffer 71"). The buffer 71 has a volume of 10 cc, which is smaller than the smallest volume of the pressurized fluid required to permit all of the four wheel brake cylinders 20, 22, 24, 26 to be activated to apply the nominal largest braking force to the wheels 10, 12, 14, 16 in the present braking system.

As indicated above, the fluid pressurized by the pump device 32 is supplied to the wheel brake cylinders 20, 22, 24, 26 through the fluid passages 72. The pressure of the fluid delivered from the pump device 32 is detected by a pump pressure sensor 74. A pressure relief valve 72 is connected to the high-pressure pump 66 (and the low-pressure pump 64), in parallel with the wheel brake cylinders 20, 22, 24, 26. The pressure relief valve 73 is opened when the delivery pressure of the high-pressure pump 66 has been raised to the nominal highest value (22 MPa in this embodiment). Between the pressure relief valve 73 and the pump pressure-pump 66, there is provided an orifice 77 which is a fluid flow restrictor functioning to prevent the amount of reduction of the pressure of the fluid pressurized by the pump device 32 if the pressure relief valve 73 cannot be closed and is held open due to sticking of the valve member caused by a foreign matter caught in the valve 73.

In the present embodiment, the pump device 32 includes the electric motors 60, 62, low-pressure pump 64, high-pressure pump 66, check valves 68, 70, buffer 71 and pressure relief valve 73. The pump device 32 serves as an electrically operated hydraulic pressure source as distinguished from the manually operated hydraulic pressure source 30. The fluid pressure generated by the pump device 32 is the fluid pressure of the electrically operated hydraulic pressure source, and the pump pressure sensor 74 is a pressure sensor for detecting the fluid pressure of the electrically operated hydraulic pressure source. It is noted that at least one of the low-pressure and high-pressure pumps 64, 66 which are both gear type pumps in this embodiment may be replaced by a plunger type pump. In this case, the corresponding check valve or valves 68, 70 may be eliminated.

Figure 3:
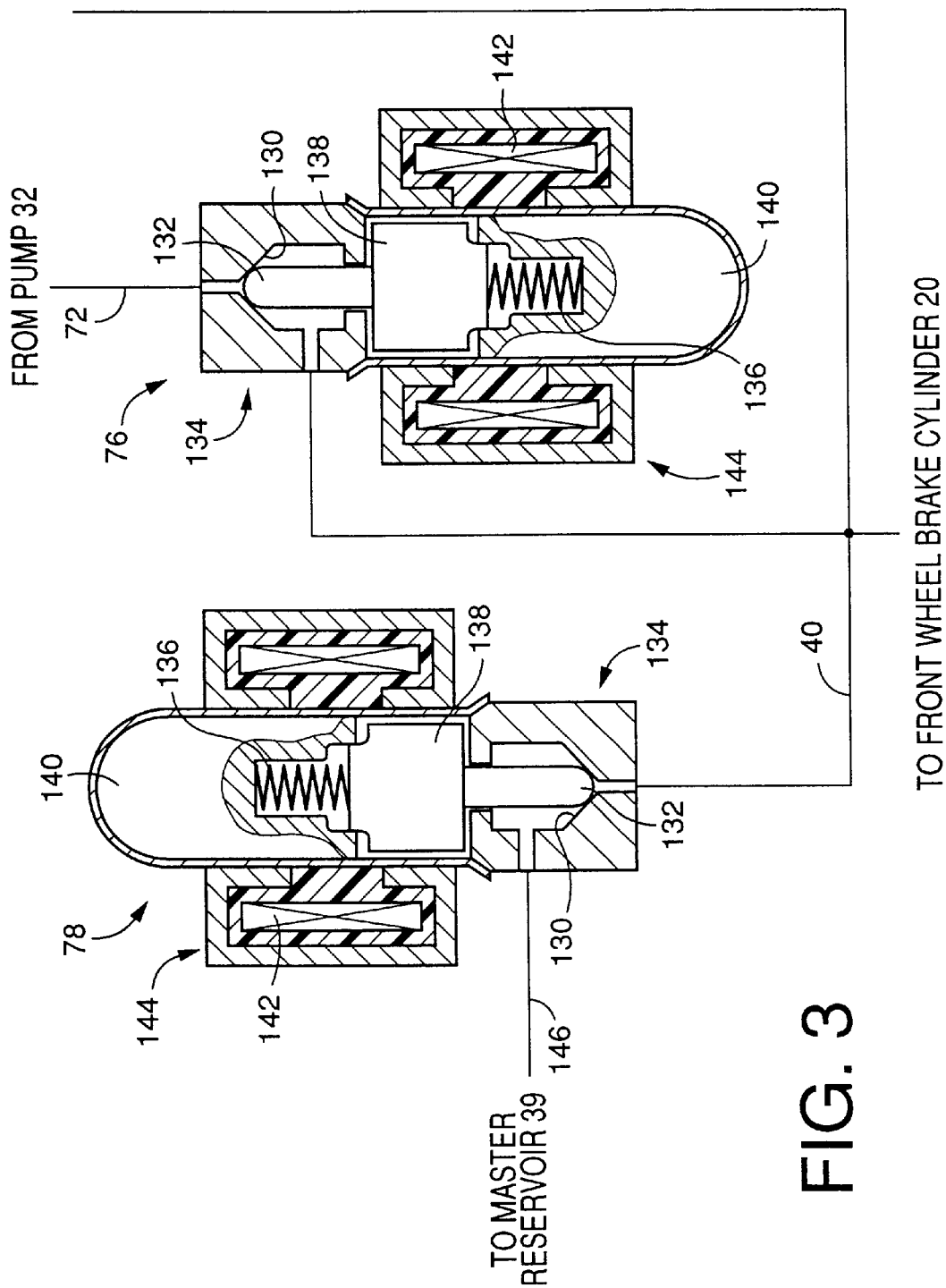
FIG. 3 is a front elevational view partly in cross section of solenoid-operated pressure increase control valve and pressure reduction control valve provided for a front wheel of the vehicle.
Figure 4:
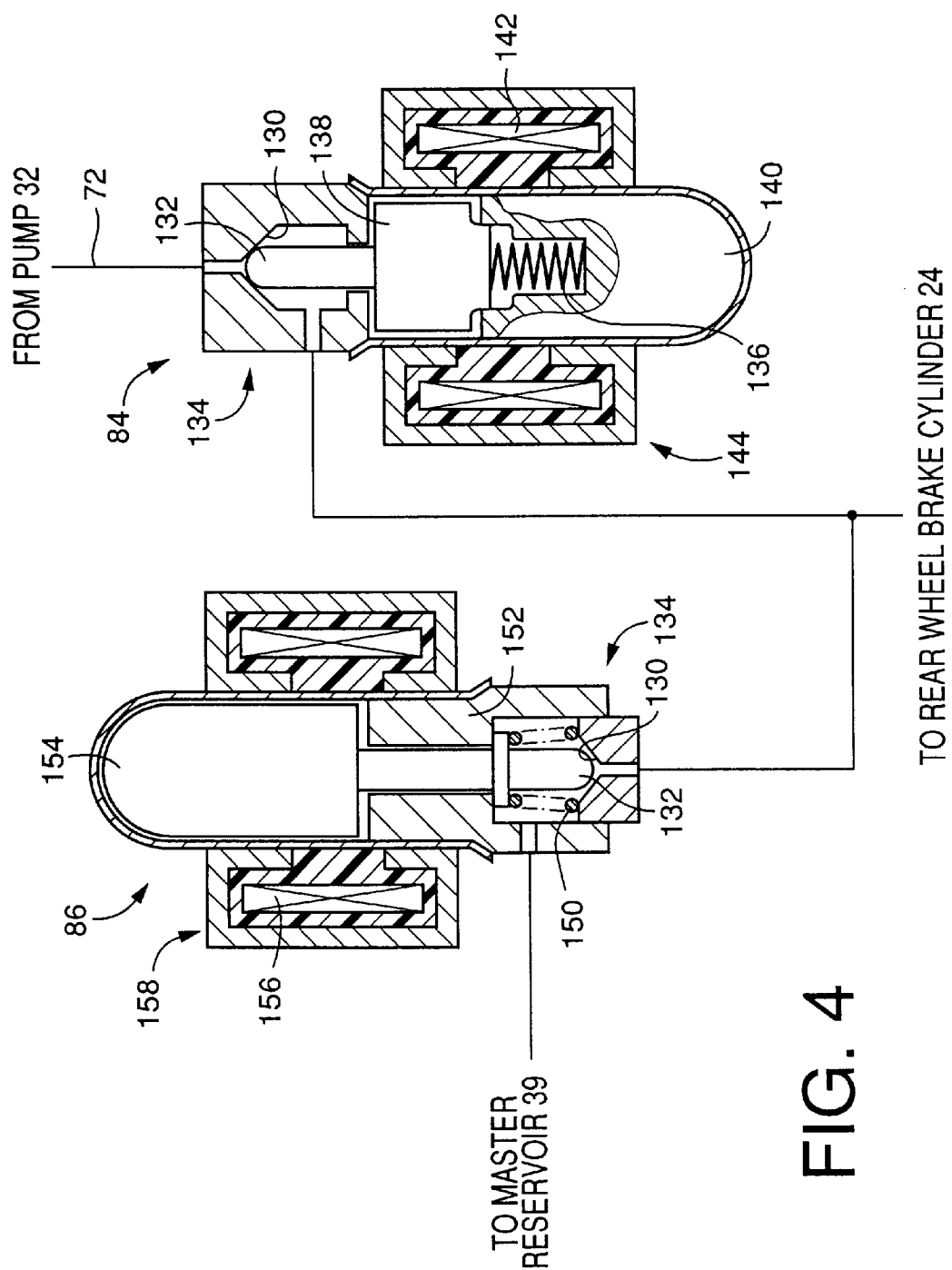
FIG. 4 is a front elevational view partly in cross section of solenoid-operated pressure increase control valve and pressure reduction control valve provided for a rear wheel of the vehicle.

For the front left wheel brake cylinder 20, there are provided a solenoid-operated pressure increase control valve 76 and a solenoid-operated pressure reduction control valve 78. For the front right wheel brake cylinder 22, there are provided a solenoid-operated pressure increase control valve 80 and a solenoid-operated pressure reduction control valve 82. The pressure increase control valve 76 and the pressure reduction control valve 78 are schematically shown in FIG. 3. Each of these control valves 76, 78 is a normally closed seating valve. The control valves 80 and 82 are identical in construction with the control valves 76 and 78, respectively. For the rear left wheel brake cylinder 24, there are provided a solenoid-operated pressure increase control valve 84 and a solenoid-operated pressure reduction control valve 86. For the rear right wheel brake cylinder 26, there are provided a solenoid-operated pressure increase control valve 88 and a solenoid-operated pressure reduction control valve 90. The pressure increase control valve 84 and the pressure reduction control valve 86 are schematically shown in FIG. 4. The control valve 84 is a normally closed seating valve. while the control valve 86 is a normally open seating valve. The control valves 88, 90 are identical in construction with the control valves 84, 86, respectively.

The fluid pressures in the rear wheel brake cylinders 24, 26 are detected by respective wheel brake cylinder pressure sensors 92, 94. It will be understood that the pressure increase control valve 76 and the pressure reduction control valve 78 constitute a pressure control valve device for the front left wheel 20, while the pressure increase control valve 80 and the pressure reduction control valve 82 constitute a pressure control valve device for the front right wheel 22. It will also be understood that the pressure increase control valve 84 and the pressure reduction control valve 86 constitute a pressure control valve device for the rear left wheel 24, while the pressure increase control valve 88 and the pressure reduction control valve 90 constitute a pressure control valve device for the rear right wheel 26. Each of these four pressure control valves devices is disposed between the pump device 32 and the corresponding one of the wheel brake cylinders 20, 22, 24, 26, so that the fluid pressure pressurized by the pump device 32 is controlled by the pressure control valve device before it is applied to the appropriate wheel brake cylinder 20, 22, 24, 26.

Referring to FIG. 3 showing the solenoid-operated pressure increase control valve 76 and the solenoid-operated pressure reduction control valve 78 for the front left wheel 10, the pressure increase control valve 76 includes a seating valve 134 having a valve seat 130 and a valve member 132 which is movable to be seated on and unseated from the valve seat 130. The valve member 132 is biased by a biasing member in the form of a spring 136 in a direction toward the valve seat 130. The pressure increase control valve 76 further includes a movable core 138 formed integrally with the valve member 132, and a stationary core 140 disposed in opposed relationship with the movable core 138. The two cores 138, 140 are biased by the spring 136 in the opposite directions away from each other. Around the cores 138, 140, there is disposed a coil 142. When the coil 142 is energized by an electric current applied thereto, the movable core 138 is attracted toward the stationary core 140, by an electromagnetic force, so that the valve member 132 is moved away from the valve seat 130, whereby the seating valve 134 is opened. The movable and stationary cores 138, 140 and the coil 142 cooperate to constitute a solenoid 144 which produces the electromagnetic force indicated above. The pressure control valve 76 is connected to the pump device 32 and the wheel brake cylinder 20 such that a force based on a fluid pressure difference across the pressure control valve 76 acts on the valve member 132 in the direction for moving the valve member 132 away from the valve seat 130. Thus, the valve member 132 is moved to a position of equilibrium at which a sum of the force based on the fluid pressure difference and the electromagnetic force produced by the solenoid 144 is equal to the biasing force of the spring 136. The electromagnetic force of the solenoid 144 is controllable by controlling the electric current to be applied to the coil 142. By thus controlling the electromagnetic force, the amount of opening of the seating valve 134 can be changed to change the amount of opening of the pressure control valve 76. Therefore, the rate of flow of the pressurized fluid through the pressure control valve 76 can be controlled, so that the rate of increase of the fluid pressure in the front left wheel brake cylinder 20 can be controlled. When the sum of the force based on the fluid pressure difference and the electromagnetic force becomes slightly smaller than the biasing force of the spring 136 as a result of a decrease in the difference between the delivery pressure of the pump device 32 and the pressure in the wheel brake cylinder 20, the valve member 132 is seated onto the valve seat 130, and the seating valve 134 is closed. Thus, the difference between the delivery pressure of the pump device 21 and the fluid pressure in the wheel brake cylinder 20 can be controlled by controlling the electric current to be applied to the coil 142.

The solenoid-operated pressure reduction control valve 78 is identical in construction with the solenoid-operated pressure increase control valve 76. In FIG. 3, the same reference numerals as used for the valve 76 are used to identify the corresponding elements of the valve 78. However, the pressure reduction control valve 78 is connected to the front left wheel brake cylinder 20 and the master reservoir 39 through the fluid passage 40 and a fluid passage 146, respectively, such that a force based on a fluid pressure difference across the control valve 78 acts on the valve member 132 in a direction for moving the valve member 132 away from the valve seat 130. The fluid pressure difference across the control valve 78 is a difference between the pressure in the wheel brake cylinder 20 and the pressure in the master reservoir 39. In this arrangement, the rate of reduction of the fluid pressure in the wheel brake cylinder 20 and the fluid pressure difference across the valve 78 can be controlled by controlling the electric current to be applied to the coil 142 of the valve 78. Since the fluid pressure in the master reservoir 39 may be considered to be substantially equal to the atmospheric pressure, the fluid pressure in the wheel brake cylinder 20 can be controlled by controlling the fluid pressure difference across the control valve 78 (the difference between the pressures in the wheel brake cylinder 20 and the master reservoir 39). As indicated above, the pressure increase control valve 80 and the pressure reduction control valve 82 for the front right wheel brake cylinder 12 are identical in construction with the control valves 76, 78 which have been described.

The solenoid-operated pressure increase control valves 84, 88 for the rear wheel brake cylinders 24, 26 are identical with the control valves 76, 80 for the front wheel brake cylinders 20, 22. In FIG. 4 showing the pressure increase control valve 84, the same reference numerals as used in FIG. 3 for the control valve 76 are used to identify the corresponding elements of the pressure increase control valve 84. However, the solenoid-operated pressure reduction control valves 86, 90 for the rear wheel brake cylinders 24, 26, which are normally open seating valves, are more or less different in construction from the pressure reduction control valves 78, 80. The pressure reduction control valve 86 will be described by way of example, by reference to FIG. 4.

Like the pressure reduction control valves 78, 82, the pressure reduction control valve 86 includes the seating valve 134 having the valve seat 130 and the valve member 132. However, this valve member 132 is biased by a spring 150, in a direction away from the valve seat 130. The seating valve 134 is disposed such that a force based on a difference between the pressures in the rear wheel brake cylinder 24 and the master reservoir 39 acts on the valve member 132 in the direction for moving the valve member 132 away from the valve seat 130. The control valve 86 includes a stationary core 152 having a center bore, a movable core 154 formed integrally with the valve member 132, and a coil 156 disposed around the stationary and movable cores 152, 154. The rear end portion of the valve member 132 extends through the center bore of the stationary core 132, and projects from this center bore, so that the valve member 132 is integrally fixed to the front end face of the movable core 154. The stationary and movable cores 152, 154 and the coil 156 cooperate to constitute a solenoid 158. When the coil 156 is energized with an electric current applied thereto, the movable core 154 is attracted toward the stationary core 152 by an electromagnetic force produced by the solenoid 158, so that the electromagnetic force acts on the valve member 132 in a direction for moving the valve member 132 toward the valve seat 130, against the force based on the difference between the pressures in the wheel brake cylinder 24 and the master reservoir 39. The biasing force of the spring 150 may be relatively small as long as it is enough to hold the valve member 132 seated on the valve seat 130 when the valve member 132 does not receive a force based on the fluid pressure difference and an electromagnetic force produced by the solenoid 158. Accordingly, the biasing force of the spring 150 may be ignored in considering the equilibrium of forces acting on the valve member 132. Each of the solenoid-operated control valves 76, 78, 80, 82, 84, 86, 88, 90 may be considered to be a valve whose opening fluid pressure difference can be changed by controlling the electric current to be applied to the coil 142, 156.

Figure 5:
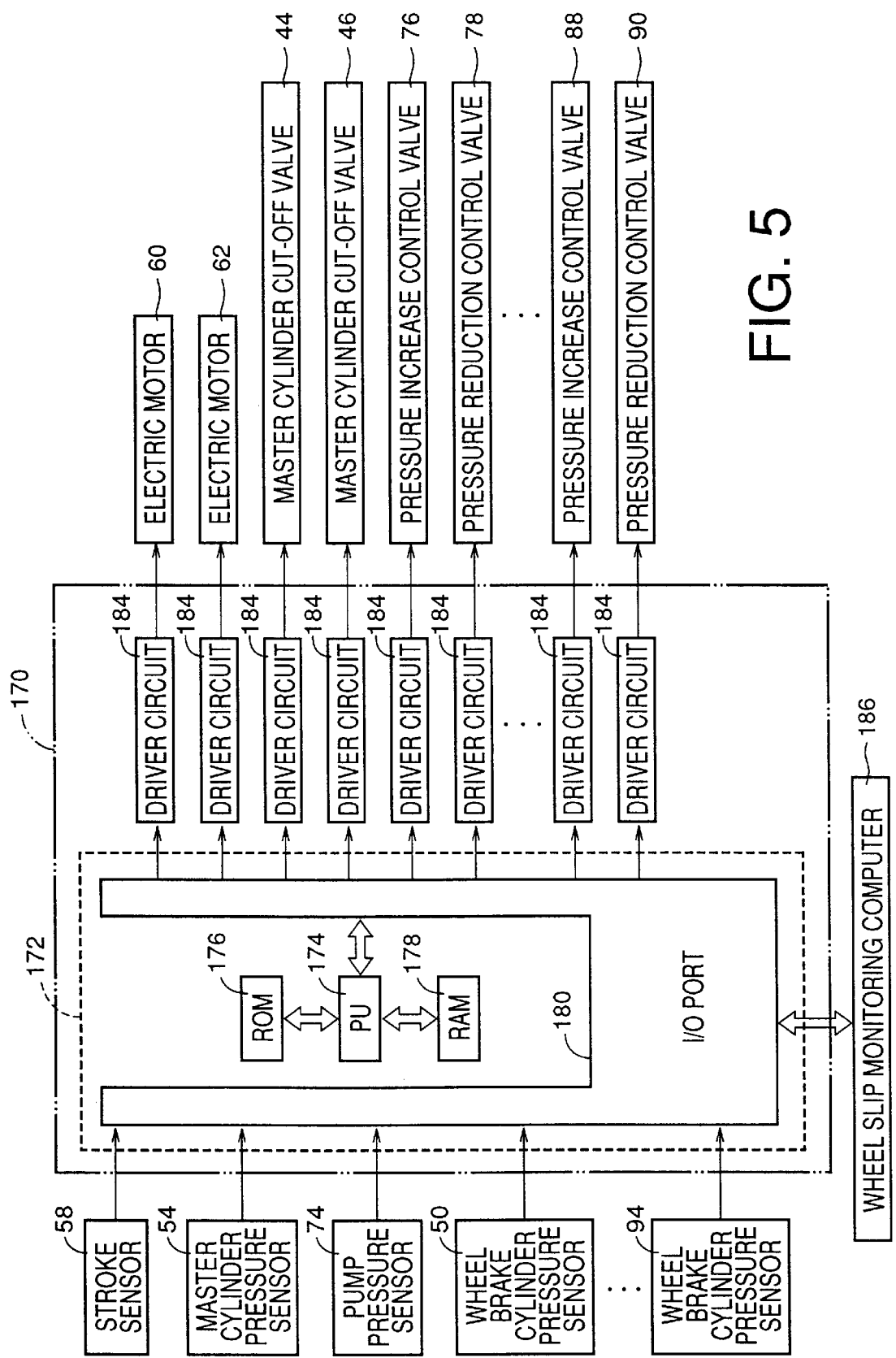
FIG. 5 is a block diagram schematically illustrating a portion of a control device for the automotive vehicle braking system, which portion relates to the subject matter of the present invention.

The various electrically operated elements which have been described are connected to the control device 170, as indicated in FIG. 5. The control device 170 is equipped with the pressure control computer 172 which incorporates a processing unit (PU) 174, a read-only memory (ROM) 176, a random-access memory (RAM) 178 and an I/O port 180. To the I/O port 180, there are connected the stroke sensor 58 and the other detectors described above. Further, the various actuators and valves such as the electric motor 60 are connected to the I/O port 180 through respective driver circuits 184. Thus, the control device 170 includes the driver circuits 184 as well as the computer 172. To the I/O port 180, there is also connected a wheel slip monitoring computer 186. The ROM 176 stores a main control routine program (not shown), and other control programs such as a normal braking control program illustrated in the flow chart of FIG. 6, a normal pump control program illustrated in the flow chart of FIG. 7, a linear valve control program illustrated in the flow chart of FIG. 8, and an emergency pump control program illustrated in the flow chart of FIG. 9.

The ROM 176 further stores an anti-lock braking pressure control program, and other braking pressure control programs such as a wheel traction control program and a vehicle running stability control program, as well known in the art. The PU 174 executes those programs to effect an anti-lock braking pressure control, a wheel traction control and a vehicle running stability control, on the basis of the output signals of the various detectors such as the stroke sensor 186 and information received from the wheel slip monitoring computer 186, while utilizing a temporary data storage function of the RAM 178. In the anti-lock braking pressure control, the fluid pressure in each wheel brake cylinder 20, 22, 24, 26 is controlled so that the amount of slipping of the corresponding wheel 10, 12, 14, 16 during an operation of the brake pedal 36 is held in an optimum range. In the wheel traction control, the fluid pressure in each of the wheel brake cylinders 24, 26 for the drive wheels 14, 16 is controlled without an operation of the brake pedal 36 such that the amount of slipping of the drive wheel 14, 16 during acceleration of the vehicle (in particular, during starting of the vehicle) is held in an optimum range. In the vehicle running stability control, the fluid pressurized by the pump device 32 is supplied to an appropriate one or ones of the wheel brake cylinders 20, 22, 24, 26, without an operation of the brake pedal 36, to apply a brake to the corresponding wheel or wheels 10, 12, 14, 16, so as to prevent excessive spinning or drifting of the vehicle, for thereby improving the running stability of the vehicle. Since these anti-lock braking pressure control, wheel traction control and vehicle running stability control do not directly relate to the subject matter of this invention, no further explanation of these controls is deemed necessary.

The RAM 178 has various control flags such as an ANTI-LOCK CONTROL PERMIT flag, as well as a working memory.

Where any one of the pump device 32, pressure control valves 76–90 and control device 170 becomes defective or abnormal, the master cylinder cut-off valves 44, 46 are held open, so that the fluid pressurized by the master cylinder 38 can be supplied to the front wheel brake cylinders 20, 22. Thus, the brakes for the front wheels 10, 12 can be activated by an operation of the brake pedal 36, in the event of some failure of the pump device 32, for instance.

When the brake pedal 36 is depressed while the pump device 32, pressure control valves 76–90 and control device 170 are normal, the master cylinder cut-off valves 44, 46 are closed to disconnect the wheel brake cylinders 20, 22 from the master cylinder 38. Accordingly, the wheel brake cylinders 20–26 are activated by the pressurized fluid supplied thereto from the pump device 32 through the pressure increase control valves 76, 80, 84, 88, as long as the pump device 32, control valves 76–90 and control device 170 are normal. Although the initiation of an operation of the brake pedal 36 may be detected by a brake switch as conventionally provided for detecting an operation of the brake pedal 36, the initiation is detected on the basis of the output signal of the stroke sensor 58 or the master cylinder pressure sensor 54, in the present braking system. When the sensors 54, 58 are both normal, an increase in the operating stroke of the brake pedal 36 as detected by the stroke sensor 58 usually takes place before an increase in the fluid pressure in the master cylinder pressure 38 as detected by the master cylinder pressure sensor 54. Accordingly, the output signal of the stroke sensor 58 is normally used to detect the initiation of the depression of the brake pedal 36, and the output of the master cylinder pressure sensor 54 is used to detect the initiation in the event of a failure of the stroke sensor 58. This fail-safe arrangement may be replaced by an arrangement in which the initiation of the operation of the brake pedal 36 is detected on the basis of either an increase in the operating stroke of the brake pedal 36 as detected by the stroke sensor 58 or an increase in the fluid pressure in the master cylinder 38 as detected by the pressure sensor 54.

Figure 6:
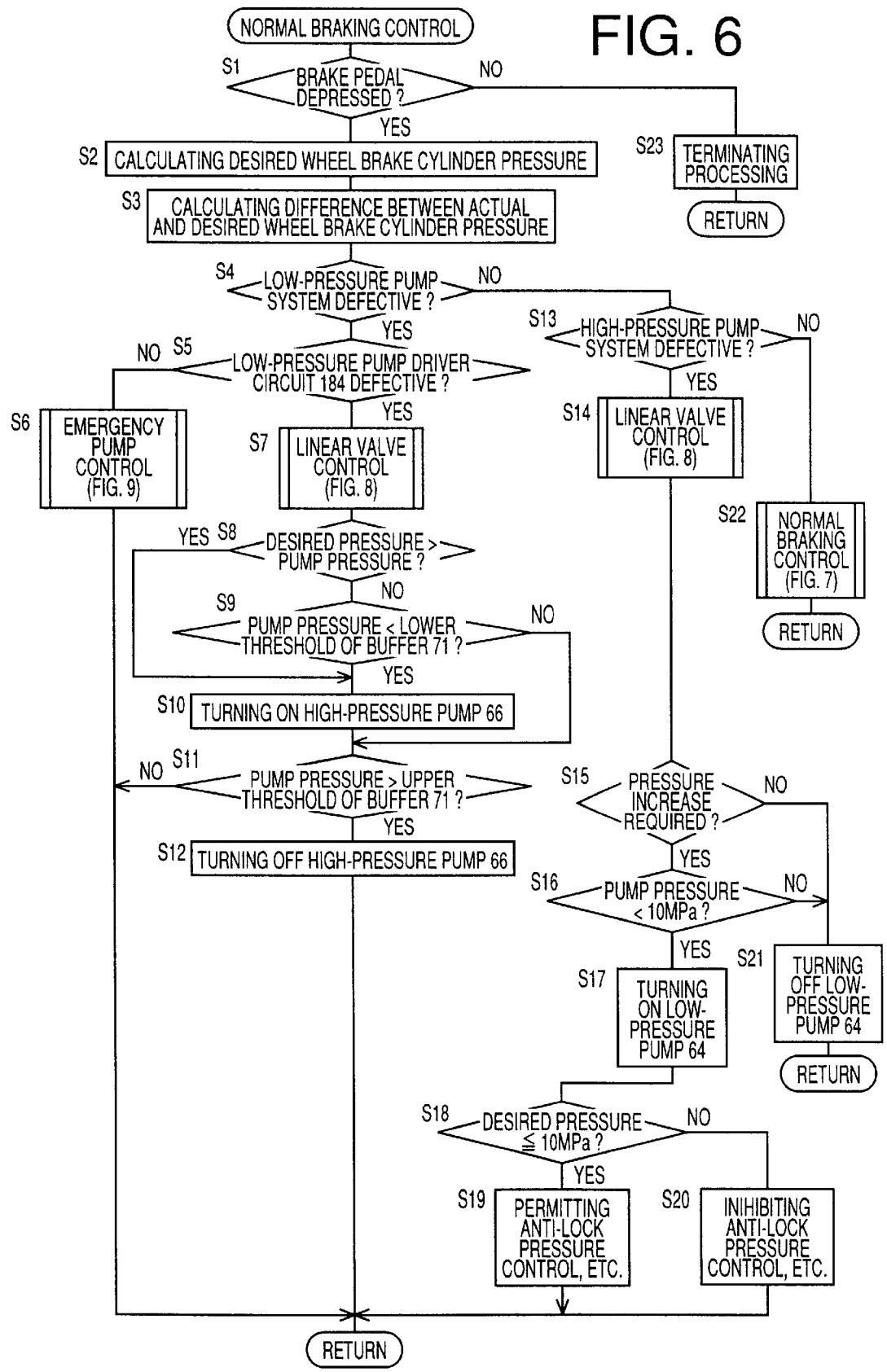
FIG. 6 is a flow chart illustrating a normal braking control program stored in a ROM of a computer of the control device of FIG. 5.

The normal braking control of the present braking system when the anti-lock braking control is not effected is effected according to the normal braking control program, as illustrated in the flow chart of FIG. 6. In the normal braking control, the fluid pressures in all of the four wheel brake cylinders 20, 22, 24, 26 are controlled to the same level. The normal braking control routine of FIG. 6 is initiated with step S1 to determine whether the brake pedal 36 has been depressed. The determination in this step S1 is normally effected on the basis of the output signal of the stroke sensor 58. If a negative decision (NO) is obtained in step S1, the control flow goes to step S23 in which a terminating processing is effected as described below.

When the brake pedal 36 is placed in an operated position, an affirmative decision (YES) is obtained in step S1, and the control flow goes to step S2 in which a desired fluid pressure in the wheel brake cylinders 20–24 (desired wheel brake cylinder pressure) is determined or calculated. In principle, the desired wheel brake cylinder pressure is determined to be proportional with the fluid pressure in the master cylinder 38 as detected by the master cylinder pressure sensor 54. However, the desired wheel brake cylinder pressure is determined by taking account of also the operating stroke of the brake pedal 36 as detected by the stroke sensor 58, since an increase in the fluid pressure in the master cylinder 38 is delayed with respect to a depressing action of the brake pedal 36. In the present embodiment, the desired wheel brake cylinder pressure Pwcnm is calculated according to the following equation:

$$Pwcnm = \gamma(t) \cdot Pmc + \delta(t) \cdot S$$

where Pmc=pressure in the master cylinder 38;
S=operating stroke of the brake pedal 36;
$\gamma(t)$=coefficient; and
$\delta(t)$=coefficient.

In the above equation, the coefficient $\gamma(t)$ increases with an increase in the time "t" after the moment of initiation of the depressing action of the brake pedal 36, while the coefficient $\delta(t)$ decreases with an increase in the time "t". However, the above equation may be replaced by any other functional equation Pwcnm=f(t, S, Pmc).

Step S2 is followed by step S3 to calculate an error or difference of the actual wheel brake cylinder pressure Pwcac from the desired wheel brake cylinder pressure Pwcnm. In a normal braking operation of the braking system, the actual fluid pressures Pwcac in all of the four wheel brake cylinders 20, 22, 24, 26 must be equal to to each other. However, the actual fluid pressures Pwcac in the wheel brake cylinders 20, 22, 24, 26 more or less differ from each other, due to a difference in the operating characteristics of the individual pressure increase control valves 76, 80, 84, 88. For this reason, step S3 is provided to obtain the error or difference of the actual fluid pressure Pwcac of each wheel brake cylinder from the desired wheel brake cylinder pressure Pwcnm.

Then, the control flow goes to step S4 to determine whether a low-pressure pump system is defective or inoperable. The low-pressure pump system includes the low-pressure pump 64, the drive circuit 184 for the pump 64, and any other components associated with the operation of the low-pressure pump 64. A similar definition applies to a high-pressure pump system which will be referred to with respect to step S13. The determination in step S4 is effected by determining whether the low-pressure pump 64 should be presently in operation and whether the pump pressure Pp of the pump device 32 is substantially equal to the desired wheel brake cylinder pressure Pwcnm. Since the low-pressure pump 64 is operated when the desired wheel brake cylinder pressure Pwcnm is 4 MPa or lower, as described above, the low-pressure pump 64 should be in operation if the desired wheel brake cylinder pressure Pwcnm is 4 MPa or lower. Further, since the electric current to be applied to the electric motor 60 for driving the low-pressure pump 64 is controlled such that the delivery pressure of the low-pressure pump 64 is equal to the desired wheel brake cylinder pressure Pwcnm, the low-pressure pump system including the low-pressure pump 64 is considered to be normally operable if the pump pressure Pp detected by the pump pressure sensor 74 is substantially equal to the desired wheel brake cylinder pressure Pwcnm. If the pump pressure Pp detected by the pump pressure sensor 74 is lower than the desired wheel brake cylinder pressure Pwcnm by more than a predetermined amount, the low-pressure pump system is considered to be defective. When step S4 is implemented in a state in which the low-pressure pump 64 should not be in operation, the low-pressure pump system is considered to be normal, even if the actual pump pressure Pp detected by the pump pressure sensor 64 is lower than the desired wheel brake cylinder pressure Pwcnm by more than the predetermined amount.

If the low-pressure pump system is not defective, namely, if a negative decision (NO) is obtained in step S4, the control flow goes to step S13 to determine whether the high-pressure pump system is defective. The determination in step S13 is effected by determining whether the high-pressure pump 66 is not normally operating while the high-pressure pump 66 should be presently in operation, that is, while the desired wheel brake cylinder pressure Pwcnm is higher than 4 MPa. The determination whether the high-pressure pump 64 is not normally operating can be effected by various methods. For instance, the determination may be effected by determining: whether the driver circuit 184 for the high-pressure pump 66 has received a signal for operating the electric motor 62; whether an electric current is presently applied to the electric motor 62; whether the pump pressure Pp has increased within a predetermined time after the initiation of operation of the high-pressure pump 66 (after the desired wheel brake cylinder pressure Pwcnm has exceeded 4 MPa); whether the pump pressure Pp has increased even when the pressure increase control valve 76, 80, 84, 88 is in the closed state; whether the wheel brake cylinder pressure Pwcac or its rate of increase is substantially equal to the value which is estimated from the operating states of the pressure control valve 76, 80, 84, 88 and the wheel brake cylinder 20, 22, 24, 26. When step S12 is implemented in a state in which the high-pressure pump 66 should not be in operation, that is, while the desired wheel brake cylinder pressure Pwcnm is 4 MPa or lower, the high-pressure pump system is considered to be normally operating. Since the method of determining whether the high-pressure pump system is defective does not directly relates to the subject matter of this invention, no further detailed explanation of the method is deemed necessary.

Figure 7:
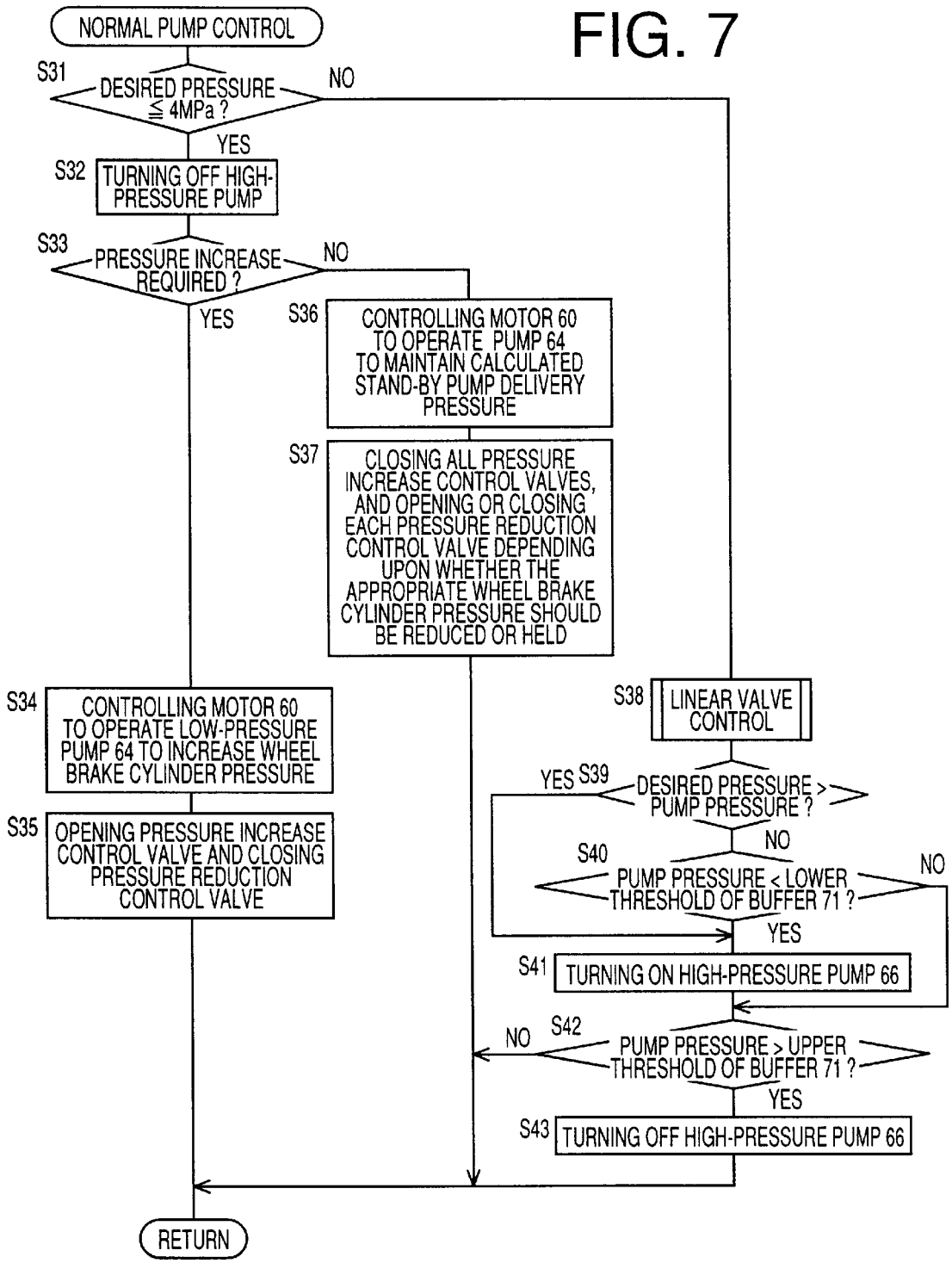
FIG. 7 is a flow chart illustrating a normal pump control program stored in the ROM of the computer of the control device of FIG. 5.

If the high-pressure pump system is not defective, that is, if a negative decision (NO) is obtained in step S13, the control flow goes to step S22 to effect the normal pump control as illustrated in the flow chart of FIG. 7. The normal pump control is initiated with step S31 to determine whether the desired wheel brake cylinder pressure Pwcnm is equal to or lower than 4 MPa. If the pressure Pwcnm is equal to 4 MPa or lower, the low-pressure pump 64 should be operated. That is, if an affirmative decision (YES) is obtained in step S31, the control flow goes to step S32 to turn off the high-pressure pump 66.

Then, the control flow goes to step S33 to determine whether the actual fluid pressure Pwcac in any one of the wheel brake cylinders 20, 22, 24, 26 should be increased. This determination in step S33 is effected on the basis of the error or difference of the actual wheel brake cylinder pressure Pwcac from the desired value Pwcnm, more specifically, effected depending upon whether the actual wheel brake cylinder pressure Pwcac is lower than the desired value Pwcnm by more than a predetermined amount $\Delta P1$. If the actual wheel brake cylinder pressure Pwcac is lower than the desired value Pwcnm by more than the predetermined amount $\Delta P1$, the actual wheel brake cylinder pressure Pwcac must be increased. In this case, an affirmative decision (YES) is obtained in step S33, and the control flow goes to step S34 to control the electric motor 60 for the low-pressure pump 64, and then to step S35 to place the appropriate pressure increase control valve 76, 80, 84, 88 in its fully open position and close the corresponding pressure reduction control valve 76, 82, 86, 90.

In step S34, the electric current to be applied to the electric motor 60 for the low-pressure pump 64 is increased so that the pump pressure Pp is made equal to the desired wheel brake cylinder pressure Pwcnm. That is, only the low-pressure pump 64 is operated to increase the actual wheel brake cylinder pressure Pwcac to the desired value Pwcnm. In this case, the amount of increase $\Delta Ip$ of the electric current I to be applied to the electric motor 60 is determined according to the following equation (1):

$$\Delta Ip = C1 \cdot (Pwcnm - Pp) + C2 \cdot \Delta Pwcnm \quad (1)$$

The amount of increase $\Delta Ip$ increases with an increase in the error or difference (Pwcnm−Pp) of the pump pressure Pp with respect to the desired wheel brake cylinder pressure Pwcnm, and with an increase in a desired rate of increase $\Delta Pwcnm$ of the desired value Pwcnm. That is, the operation of the low-pressure pump 64 is controlled on the basis of the pump pressure Pp detected by the pump pressure sensor 74, so as to increase the actual wheel brake cylinder pressure Pwcac at the desired rate to the desired wheel brake cylinder pressure Pwcnm which is determined by the operating force acting on the brake pedal 36. In other words, the drive force of the low-pressure pump 64 is controlled to establish the desired pump pressure Pp corresponding to the desired wheel brake cylinder pressure Pwcnm. The values C1 and C2 in the above equation (1) are constants determined by the delivery characteristic of the low-pressure pump 64.

In step S35, the pressure reduction control valve 78, 82 which is a normally closed valve is held closed without application of an electric current to the coil 142. On the other hand, the pressure reduction control valve 86, 90 which is a normally open valve is closed with the valve member 132 being seated onto the valve seat 130 by application of an electric current to the coil 156. The fluid pressure difference across the seating valve 134 of the pressure reduction control valve 86, 90 is equal to the fluid pressure in the wheel brake cylinder 24, 26. Accordingly, the actual wheel brake cylinder pressure Pwcac is equal to the desired value Pwcnm when the following equation (2) is satisfied:

$$k1 \cdot Ido = F1 + S1 \cdot Pwcnm \quad (2)$$

wherein S1·Pwcnm represents the force which acts on the valve member 132 based on the fluid pressure difference across the seating valve 134, and k1·Ido represents the electromagnetic force produced by the solenoid 158, while F1 represents the biasing force of the spring 150. "S1" represents the pressure-receiving area of the valve member 132, and "k1" is a constant.

The above equation (2) may be converted into the following equation (3):

$$Ido = (F1 + S1 \cdot Pwcnm)/k1 \quad (3)$$

The electric current I to be applied to the coil 156 is determined to be only slightly larger than the calculated value Ido, so that the pressure reduction control valve 86, 90 is held closed with a minimum amount of the electric current I, while the actual wheel brake cylinder pressure Pwcac is held at the desired value Pwcnm.

Thus, the delivery pressure Pp of the pump device 32 is controlled to be the desired wheel brake cylinder pressure Pwcnm, and the fluid pressurized by the pump device 32 is delivered to the wheel brake cylinder 20, 22, 24, 26 in question, through the fully open pressure increase control valves 76, 80, 84, 88, with the pressure reduction control valve 78. 82, 86, 90 being closed, so that the actual wheel brake cylinder pressure Pwcac is increased to brake the corresponding wheel 10, 12, 14, 16 with a braking force corresponding to the operating force acting on the brake pedal 36. If the actual fluid pressures Pwcac of the individual wheel brake cylinders 20, 22, 24, 26 which are slightly different from each other are controlled with the pump pressure Pp being controlled to the desired wheel brake cylinder pressure Pwcnm, the actual wheel brake cylinder pressure values Pwcac after the control are still different from each other. However, this difference of the actual wheel brake cylinder pressures Pwcac, which is caused by differences of the operating characteristics of the pressure increase control valves 76, 80, 84, 88, is not so large. In this respect, it is considered that the actual fluid pressures Pwcac of the four wheel brake cylinders 20, 22, 24, 26 can be increased to substantially the same level.

If a negative decision (NO) is obtained in step S33, that is, if none of the fluid pressures of the four wheel brake cylinders 20, 22, 24, 26 are required to be increased, the control flow goes to step S36 to control the electric motor 60 to operate the low-pressure pump 64 to maintain a stand-by delivery pressure of the pump 64, as described below in detail, and to step S37 to control the control valves 76–90 to hold or reduce the wheel brake cylinder pressures. In step S36, the electric motor 60 is controlled to operate the low-pressure pump 64 so that the pump pressure Pp of the pump device 32 established by operation of the low-pressure pump 64 is maintained at a calculated stand-by value which is higher than the highest one of the fluid pressures of the four wheel brake cylinders 20–26, by a predetermined additional amount. Described more specifically, the stand-by value is a sum of the highest one of the wheel brake cylinder pressures detected by the wheel brake cylinder pressure sensors 50, 52, 92, 94 and the predetermined additional amount. The electric current I to be applied to the electric motor 60 is controlled so that the delivery pressure of the low-pressure pump 64 (pump pressure Pp of the pump device 32) is made equal to the thus calculated stand-by value. With this stand-by delivery pressure control of the low-pressure pump 60 in step S36 permits a rapid increase in the wheel brake cylinder pressure, when the increase is required and effected in steps S34 and S35, since the fluid pressurized by the low-pressure pump 64 can be rapidly supplied to the wheel brake cylinder in question. If the calculated stand-by pump pressure Pp exceeds 4 MPa, the electric motor 62 for the high-pressure pump 66 is controlled so that the calculated stand-by pump pressure Pp is established by operation of the high-pressure pump 66.

In step S37, all of the pressure increase control valves 76, 80, 84, 88 are closed without application of an electric current to the coil 142. Further, the pressure reduction control valve 78, 82, 86, 90 corresponding to the wheel brake cylinder 20–26 whose fluid pressure is required to be increased is opened, and the pressure reduction control valve corresponding to the wheel brake cylinder whose fluid pressure is required to be held at the present level is closed. That is, if the difference (Pwcnm–Pwcac) is larger than a predetermined value –ΔP2, the actual wheel brake cylinder pressure Pwcac is required to be reduced. If the difference is smaller than the predetermined value ΔP1 (used in step S33) and larger than the predetermined value –ΔP2, the actual wheel brake cylinder pressure Pwcac is required to be held at the present level. When the fluid pressure Pwcac of the front wheel brake cylinder 20, 22 is reduced, the electric current I to be applied to the coil 142 to open the normally closed pressure reduction control valve 78, 82 is determined on the basis of the desired value Pwcnm and the actual value Pwcac. As described above, the fluid pressure difference across the seating valve 134 of the pressure reduction control valves 78, 82 is equal to the actual wheel brake cylinder pressure Pwcac. Accordingly, the actual wheel brake cylinder pressure Pwcac is equal to the desired value Pwcnm when the following equation (4) is satisfied:

$$k2 \cdot Idc + S2 \cdot Pwcnm = F2 \qquad (4)$$

wherein S2·Pwcnm represents the force which acts on the valve member 132 based on the fluid pressure difference across the seating valve 134, and k2·Idc represents the electromagnetic force produced by the solenoid 144, while F2 represents the biasing force of the spring 136. "S2" represents the pressure-receiving area of the valve member 132, and "k2" is a constant.

The above equation (4) may be converted into the following equation (5):

$$Idc = (F2 - S2 \cdot Pwcnm)/k2 \qquad (5)$$

The electric current Idc to be applied to the coil 142 is adjusted by an adjusting amount ΔIdc which is calculated according to the following equation (6) and on the basis of the actual and desired wheel brake cylinder pressure values Pwcac and Pwcnm:

$$\Delta dc = k3 \cdot (Pwcac - Pwcnm) \qquad (6)$$

wherein "k3" represents a constant.

If the pressure reduction control valve 78, 82 has the nominal specifications, the actual wheel brake cylinder pressure Pwcac is made equal to the desired value Pwcnm by energizing the coil 142 with the electric current Idc as calculated according to the above equation (5). Actually, however, the electric current Idc does not permit the actual wheel brake cylinder pressure Pwcac to be equal to the desired value Pwcnm, due to manufacturing errors of the control valve 78, 82 (due to deviation of the actual specifications from the nominal specifications as designed). Therefore, the electric current Idc is adjusted, namely, increased by reduced by the adjusting amount ΔIdc obtained according to the above equation (6), so that the actual wheel brake cylinder pressure Pwcac can be made equal to the desired value Pwcnm by application of the electric current I=Idc+ΔIdc to the coil 142. According to the equation (6), the electric current I is increased to increase the amount of opening of the control valve 78, 82, with an increase in the difference (Pwcac–Pwcnm), so that the actual wheel brake cylinder pressure Pwcac can be rapidly reduced. The adjusting amount ΔIdc is obtained for each of the pressure reduction control valves 78, 82 on the basis of the actual fluid pressure Pwcac of each front wheel brake cylinder 20, 22.

When the fluid pressure of the rear wheel brake cylinder 24, 26 is held at the present level, the electric current to be applied to the coil 156 of the corresponding pressure reduction control valve 86, 90 is determined in the same manner as described above with respect to step S35. When the fluid pressure of the rear wheel brake cylinder 24, 26 is reduced, the electric current Ido to be applied to the coil 156 is provisionally calculated according to the above equation (3). Then, the electric current Ido is adjusted by an adjusting amount ΔIdo which is calculated according to the following equation (7) and on the basis of the actual and desired wheel brake cylinder pressure values Pwcac and Pwcnm;

$$\Delta Ido = k4 \cdot (Pwcac - Pwcnm) \qquad (7)$$

wherein "k4" represents a constant.

The electric current to be applied to the coil 156 is reduced when the actual wheel brake cylinder pressure Pwcac is higher than the desired value Pwcnm, and is increased when the actual wheel brake cylinder pressure Pwcac is lower than the desired value Pwcnm. Thus, the electric current I to be applied to the coil 156 is adjusted so that the actual wheel brake cylinder pressure Pwcac is made equal to the desired value Pwcnm. The adjusting amount ΔIdo is obtained for each of the pressure reduction control valves 86, 90 on the basis of the actual fluid pressure Pwcac of each rear wheel brake cylinder 24, 26.

If the desired wheel brake cylinder pressure Pwcnm calculated in step S2 is higher than 4 MPa, a negative decision (NO) is obtained in step S31, and the control flow goes to steps S38–43, to selectively turn on and off the high-pressure pump 66, and control the pump pressure Pp of the pump device 32 by the control valves 76–90. In step S38, a linear valve control is effected to control the control valves 76–90, as illustrated in the flow chart of FIG. 8.

Figure 8:
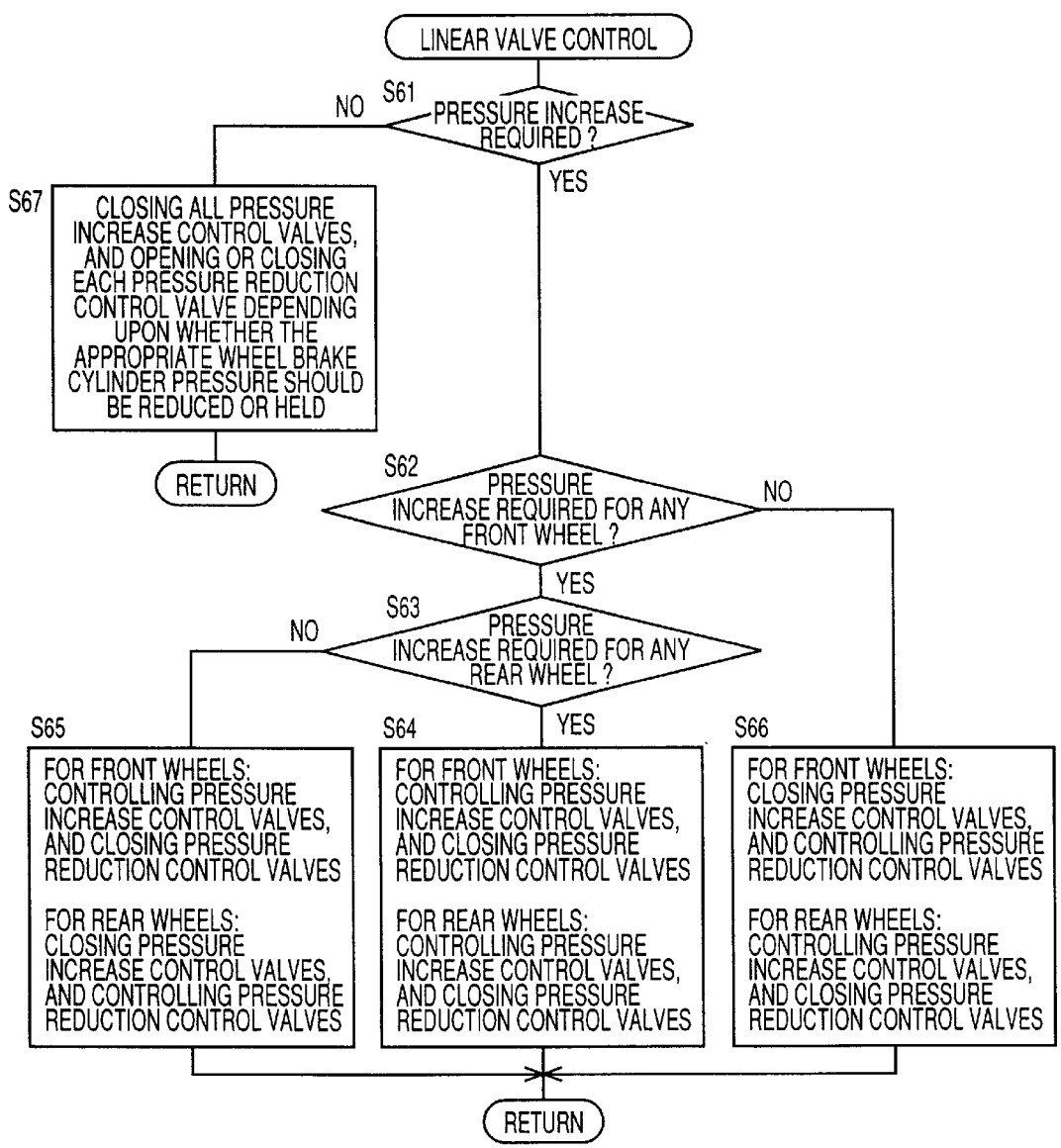
FIG. 8 is a flow chart illustrating a linear valve control program stored in the ROM of the computer of the control device of FIG. 5.
Figure 9:
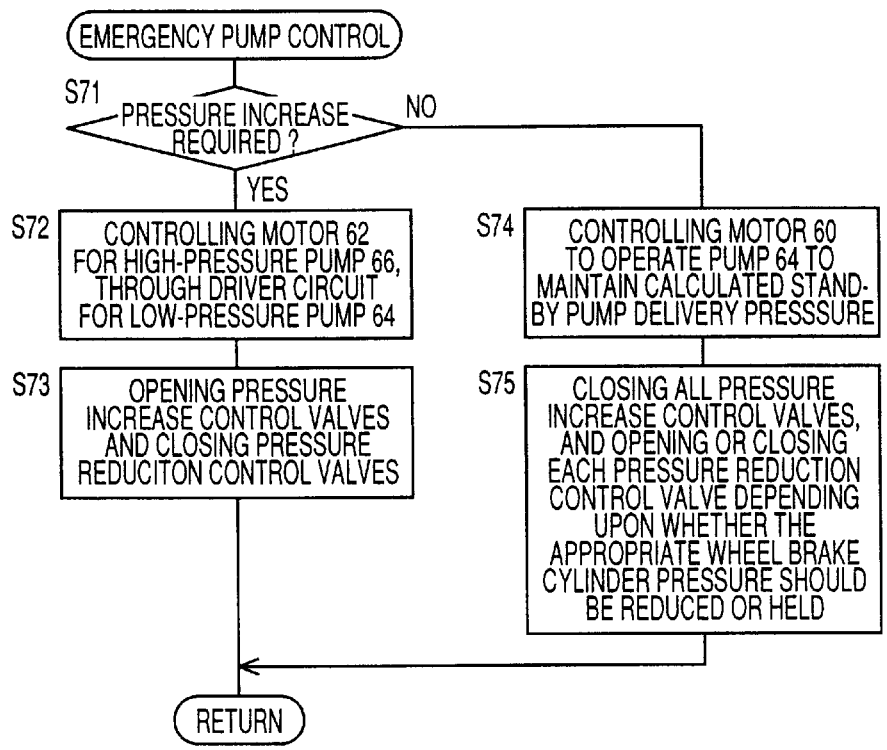
FIG. 9 is a flow chart illustrating an emergency pump control program stored in the ROM and executed when the low-pressure pump is defective while a driver for the low-pressure pump is normal.
Figure 10:
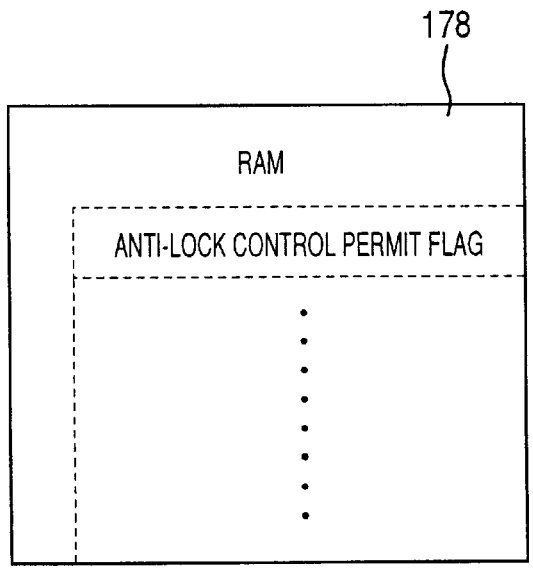
FIG. 10 is a block diagram schematically showing a portion of a RAM of the computer of the control device of FIG. 5, which portion relates to the subject matter of the present invention.

The linear valve control of FIG. 8 is initiated with step S61 to determine whether at least one of the wheel brake cylinder pressures Pwcac for the wheels 10–16 is required to be increased. The determination in step S38 is made in the same manner as described above with respect to step S33. If an affirmative decision (YES) is obtained in step S61, the control flow goes to step S62 to determine whether at least one of the fluid pressures Pwcac of the front wheel brake cylinders 20, 22 is required to be increased. If an affirmative decision (YES) is obtained in step S62, the control flow goes to step S63 to determine whether at least one of the fluid pressures Pwcac of the rear wheel brake cylinders 24, 26 is also required to be increased. If an affirmative decision (YES) is obtained in step S63, the control flow goes to step S64 in which the pressure increase control valves 76, 80, 84, 88 for the front and rear wheel brake cylinders 20, 22, 24, 26 are controlled, while the pressure reduction control valves are all closed. Unlike the low-pressure pump 64, the high-pressure pump 66 is not controlled such that the delivery pressure is made equal to the desired wheel brake cylinder pressure Pwcnm, but is selectively turned on and off, as described below with respect to step S39–S42 (FIG. 7). The fluid pressure as delivered from the high-pressure pump 66 is controlled by the pressure increase control valves 76, 80, 84, 99, before it is applied to the wheel brake cylinders 20–26.

The actual wheel brake cylinder pressure Pwcac is equal to the desired value Pwcnm when the following equation (8) is satisfied:

$$k5 \cdot Ii + S3 \cdot (Pp - Pwcnm) = F3 \quad (8)$$

wherein $S3 \cdot (Pp - Pwcnm)$ represents the force which acts on the valve member 132 based on the fluid pressure difference across the seating valve 134 of the pressure increase control valve 76, 80, 84, 88, and $k5 \cdot Ii$ represents the electromagnetic force produced by the solenoid 144, while F3 represents the biasing force of the spring 136. "S3" represents the pressure-receiving area of the valve member 132, and "k5" is a constant.

The above equation (8) may be converted into the following equation (9):

$$Ii = \{(F3 - S3 \cdot (Pp - Pwcnm)\}/k5 \quad (9)$$

The electric current Ii to be applied to the coil 142 is adjusted by an adjusting amount $\Delta Ii$ which is calculated according to the following equation (10) and on the basis of the actual and desired wheel brake cylinder pressure values Pwcac and Pwcnm:

$$\Delta Ii = k6 \cdot (Pwcac - Pwcnm) \quad (10)$$

wherein "k6" represents a constant.

For the same reason as described above with respect to the pressure reduction control valves 78, 82, the application of the electric current Ii calculated according to the above equation (9) to the coil 142 will not cause the actual wheel brake cylinder pressure Pwcac to be equal to the desired value Pwcnm. Therefore, the electric current Ii is adjusted by the adjusting amount $\Delta Ii$ calculated according to the above equation (10). The electric current I to be applied to the coil 142 is increased to increase the amount of opening of the pressure increase control valve 76, 80, 84, 88, with an increase in the difference (Pwcac–Pwcnm). The electric current I to be applied to the pressure reduction control valves 86, 90 is controlled in the same manner as in step S35, so that the control valves 86, 90 are held closed. It is noted that the same desired wheel brake cylinder pressure Pwcnm is used for all of the four wheels 10–16. It is also noted that when only one of the front wheel brake cylinders 20, 22 is required to be increased, the fluid pressure in the other front wheel brake cylinder 20, 22 is also increased, and that when only one of the rear wheel brake cylinders 24, 26 is required to be increased, the fluid pressure in the other rear wheel brake cylinder 24, 26 is also increased. The adjusting value $\Delta Ii$ is obtained for each of the pressure increase control valves 76, 80, 84, 88, on the basis of the actual fluid pressure Pwcac in the corresponding wheel brake cylinder 20, 22, 24, 26.

When at least one of the fluid pressures in the front wheel brake cylinders 20, 22 is required to be increased while the none of the fluid pressures in the rear wheel brake cylinders 24, 26 is required to be increased, an affirmative decision (YES) is obtained in step S62 while a negative decision (NO) is obtained in step S63, and the control flow goes to step S65 in which the pressure increase control valves 76, 80 for the front wheel brake cylinders 20, 22 are controlled in the same manner as in step S64, and the pressure reduction control valves 78, 82 for the cylinders 20, 22 are closed. Further, the pressure increase control valves 84, 88 for the rear wheel brake cylinders 24, 26 are are closed, while the pressure reduction control valves 86, 90 for the cylinders 24, 26 are controlled. When the fluid pressures in the rear wheel brake cylinders 24, 26 are required to be held at the present level, the pressure reduction control valves 86, 90 are closed. When the fluid pressures in the cylinders 24, 26 are required to be reduced, the electric current I to be applied to the coil 156 of the control valves 86, 90 is controlled depending upon the desired wheel brake cylinder pressure Pwcnm. This electric current is determined in the same manner as in step S37.

When none of the fluid pressures in the front wheel brake cylinders 20, 22 are required to be increased while any one of the fluid pressures in the rear wheel brake cylinders 24, 26 is required to be increased, a negative decision (NO) is obtained in step S62, and the control flow goes to step S66 in which the pressure increase control valves 76, 80 for the front wheel brake cylinders 20, 22 are closed, and the pressure reduction control valves 78, 82 for the cylinders 20, 22 are controlled. When the fluid pressures in the cylinders 20, 22 are required to be held, the pressure reduction control valves 78, 82 are closed. When the fluid pressures in the cylinders 20, 22 are required to be reduced, the electric current I to be applied to the coil 142 of the control valves 78, 82 is controlled in the same manner as in step S37. Further, the electric current I to be applied to the coil 142 of the pressure increase control valves 84, 88 for the rear wheel brake cylinders 24, 26 is controlled in the same manner as in step S64, and the pressure reduction control valves 86, 90 for the rear wheel brake cylinders 24, 26 are closed.

When the none of the fluid pressures of the four wheel brake cylinders 20–26 are required to be increased, a negative decision (NO) is obtained in step S61, and the control flow goes to step S67 to close all of the pressure increase control valves 76, 80, 94, 88, and open or close each of the pressure reduction control valves 78, 82, 86, 90 depending upon whether the appropriate wheel brake cylinder pressure should be reduced or held. The control in step S67 is similar to the control in step S37. It is noted that since the high-pressure pump 66 is selectively turned on and off, the stand-by delivery pressure control of the high-pressure pump 66 is not effected. That is, the delivery pressure of the high-pressure pump 66 is not maintained at a stand-by value which is a sum of the highest one of the four wheel brake cylinder pressures and a predetermined additional amount.

The linear valve control in step S38 is followed by steps S38–S43 in which the high-pressure pump 66 is selectively turned on and off. Where the low-pressure pump 64 is normally functioning, the high-pressure pump 66 is operated or turned on when the desired wheel brake cylinder pressure Pwcnm higher than 4 MPa is higher than the actual pump pressure Pp, or when the pressurized fluid is stored in the buffer 72 under pressure. In either of these cases, the high-pressure pump 66 is turned off when the pressure of the fluid stored in the buffer 71 has been raised to a predetermined upper threshold. Unlike the low-pressure pump 64, the high-pressure pump 66 is not controlled such that its delivery pressure is made equal to the desired wheel brake cylinder pressure Pwcnm, but is selectively turned on and off. To control the actual wheel brake cylinder pressures Pwcac, therefore, the solenoid-operated pressure control valves 76–90 are appropriately controlled in step S38. It is noted that even after the desired wheel brake cylinder pressure Pwcnm has exceeded 4 MPa, the low-pressure pump 74 is kept operated by the electric motor 70 which is kept energized with an electric current I corresponding to the delivery pressure of 4 MPa of the low-pressure pump 74 When the desired wheel brake cylinder pressure Pwcnm is higher than the present pump pressure Pp of the pump device 32, an affirmative decision (YES) is obtained in step S39 following step S38, and the control flow goes to step S41 to turn on the high-pressure pump 66. Then, the control flow goes to step S42 to determine whether the pump pressure Pp is higher than the predetermined upper threshold of the buffer 71. In this embodiment, the upper threshold pressure value of the buffer 71 is determined to be 19 MPa, which is lower than the upper pressure limit of 20 MPa described before, in order to prevent overloading of the high-pressure pump 66 and its drive motor 62, and a rise of the pump pressure Pp above the relief pressure of the pressure relief valve 73 due to cumulative control errors. When step S42 is implemented for the first time, a negative decision (NO) is obtained in step S42. Step S41 is repeatedly implemented to keep operating the high-pressure pump 66, until the pump pressure Pp lower than the desired wheel brake cylinder pressure Pwcnm has been raised to the predetermined upper threshold of the buffer 71, that is, until the pressure of the fluid accommodated in the buffer 72 has been raised to 19 MPa. The wheel brake cylinders 20–26 are activated based on the delivery pressure of the high-pressure pump 66, with the wheel brake cylinder pressures Pwcac being controlled by the control valves 76–90 as described above. When the pump pressure Pp has been increased to the upper threshold value of the buffer 71, an affirmative decision (YES) is obtained in step S42, and the control flow goes to step S43 to turn off the high-pressure pump 66.

When the pump pressure Pp is equal to or higher than the desired wheel brake cylinder pressure Pwcnm, a negative decision (NO) is obtained in step S39, and the control flow goes to step S40 to determine whether the pump pressure Pp is lower than a predetermined lower threshold of the buffer 71. This lower threshold is determined to be 10 MPa, which is lower than the lower pressure limit of 11 MPa, so that the high-pressure pump 66 is turned on before the buffer 71 has become empty, whereby the storage of the fluid pressurized by the high-pressure pump 66 is initiated while some amount of the pressurized fluid is accommodated in the buffer 71. Accordingly, the buffer 71 is prevented from being empty, to prevent the flow rate of the pressurized from to the pressure control valves 76–90 from being limited by the delivery flow rate of the high-pressure pump 66. When the pump pressure Pp is lower than the lower threshold of the buffer 71, an affirmative decision (YES) is obtained in step S40, and the control flow goes to step S41 to turn on the high-pressure pump 66. Step S41 is followed by step S42, but a negative decision (NO) is initially obtained in step S42. When the pump pressure Pp has been raised above the upper threshold of the buffer 71, an affirmative decision (YES) is obtained in step S42, and the control flow goes to step S43 to turn off the high-pressure pump 66.

As long as the high-pressure pump 66 is kept operated with the pump pressure Pp being not higher than the desired wheel brake cylinder pressure Pwcnm and the upper threshold of the buffer 71, the wheel brake cylinders 20–26 are operated based on the delivery pressure of the high-pressure pump 66. The pump pressure Pp detected by the pump pressure sensor 74 represents the pressure of the fluid accommodated in the buffer 71. When the desired wheel brake cylinder pressure Pwcnm is higher than the pump pressure Pp, the fluid pressure in the buffer 71 does not permit a required increase in the fluid pressures in the wheel brake cylinders 20–26. In this case, the high-pressure pump 66 is operated so that the delivery pressure Pp of the pump 66 is applied to the wheel brake cylinders 20–26.

After the fluid pressure in the buffer 71 has been raised to the predetermined upper threshold, the high-pressure pump 66 is held off, as long as the pump pressure Pp is higher than the desired wheel brake cylinder pressure Pwcnm and not lower than the lower threshold of the buffer 71. In this state, the wheel brake cylinders 20–26 are operated based on the pressurized fluid supplied from the buffer 71. In this case, a negative decision (NO) is obtained in steps S39, S40 and S42, and the high-pressure pump 66 is held off, and the wheel brake cylinders 20–26 are operated with the pressurized fluid in the buffer 71 being supplied thereto after its pressure is controlled by the pressure control valves 76–90. When the desired wheel brake cylinder pressure Pwcnm has become higher than the pump pressure Pp, the high-pressure pump 66 is turned on to supply its pressurized fluid to the wheel brake cylinders 20–26, and to accommodate the pressurized fluid in the buffer 71 until the fluid pressure in the buffer 71 has been raised to the upper threshold.

Even when the desired wheel brake cylinder pressure Pwcnm is equal to or lower than the pump pressure Pp, the pressurized fluid is supplied from the buffer 71 to the wheel brake cylinders 20–27, so that the pump pressure Pp is lowered. When the fluid pressure in the buffer 71 has been lowered below the lower threshold of the buffer 71, an affirmative decision (YES) is obtained in step S40, and the control flow goes to step S41 to turn on the high-pressure pump 66, so that the pressurized fluid delivered from the pump 66 is stored in the buffer 71, and is at the same time supplied to the brake cylinders 20–26 with its pressure being controlled by the pressure increase control valves 76, 80, 84, 88.

There will next be described an operation of the braking system where the low-pressure pump system is found defective.

Where the low-pressure pump system is defective, an affirmative decision (YES) is obtained in step S4, and the control flow goes to step S5 to determine whether the driver circuit 184 for the low-pressure pump motor 60 is defective. The determination in step S5 is made on the basis of an output of a diagnostic device provided on the present braking system. If the low-pressure pump driver circuit 184 is normal, it means that the low-pressure pump 64 per se is defective. In this case, a negative decision (NO is obtained in step S5, and the control flow goes to step S6 to effect an emergency pump control according to the emergency pump control program as illustrated in the flow chart of FIG. 9.

Where the low-pressure pump 64 is defective while the driver circuit 184 for the low-pressure pump drive electric motor 70 is normal, the high-pressure pump 66 is held operated through the low-pressure pump driver circuit 184, irrespective of the desired wheel brake cylinder pressure Pwcnm is higher or lower than 4 MPa, so that the drive force of the high-pressure pump 66 is controlled to a value corresponding to the desired wheel brake cylinder pressure Pwcnm. Namely, the emergency pump control is initiated with step S71 to determine whether the actual pressure Pwcac of any one of the wheel brake cylinders 20–26 is required to be increased. The determination in step S71 is similar to that in step S33 which has been described. If an affirmative decision (YES) is obtained in step S71, the control flow goes to step S72 in which the electric motor 62 for the high-pressure pump 66 is operated through the driver circuit 194 for the low-pressure pump drive electric motor 60, so that the drive force of the high-pressure pump 66 is controlled to the value corresponding to the desired wheel brake cylinder pressure Pwcnm, in the same manner as described above with respect to the normally functioning low-pressure pump 62. At this time, the amount of increase of the electric current to be applied to the electric motor 62 is calculated according to the above equation (1), like the amount of increase of the electric motor to be applied to the electric motor 60. However, the coefficients C1 and C2 in the equation (1) for the electric motor 62 are different from those for the electric motor 60, that is, determined depending upon the delivery characteristic of the high-pressure pump 66. Step S72 is followed by step S73 in which the pressure increase control valves 76, 80, 84, 88 are fully opened while the pressure reduction control valves 78, 82, 86, 90 are closed.

If none of the wheel brake cylinder pressures are required to be increased, a negative decision (NO) is obtained in step S74, and the control flow goes to steps S74 and S75 which are similar to steps S36 and S37, respectively, so that the fluid pressure in each wheel brake cylinder 20, 22, 24, 26 is held or reduced. Where the low-pressure pump 64 is defective while the driver circuit 184 for the electric motor 70 for the low-pressure pump 64, the drive force of the high-pressure pump 66 is controlled to a value corresponding to the desired wheel brake cylinder pressure Pwcnm, irrespective of whether the desired wheel brake cylinder pressure Pwcnm is higher or lower than 4 MPa, so that the pump pressure Pp is controlled to the desired wheel brake cylinder pressure Pwcnm.

There will be described an operation of the braking system where both the low-pressure pump 64 and the driver circuit 184 for the electric motor 60 are defective. Since the driver circuit 184 for the electric motor 60 for the low-pressure pump 64 is defective, the high-pressure pump 66 is selectively turned on and off irrespective of whether the desired wheel brake cylinder pressure Pwcnm is higher or lower than 4 MPa, so that the wheel brake cylinders are activated with the fluid pressurized by the high-pressure pump 66. Further, the linear valve control is effected to control the pressure increase control valves 76, 80, 84, 88 so that the pump pressure Pp of the pump device 32 as controlled by these control valves is applied to the wheel brake cylinders 20, 22, 24, 26.

Since the low-pressure pump motor driver circuit 184 is defective, an affirmative decision (NO) is obtained in step S5, and the control flow goes to step S7 in which the linear valve control is effected in the same manner as in step S38. Then, steps S8–S12 similar to steps S39–S43 are implemented to turn on and off the high-pressure pump 66 depending upon the desired wheel brake cylinder pressure Pwcnm and the pump pressure Pp, and to store the pressurized fluid in the buffer 71, so that the wheel brake cylinders 20–26 are operated with the fluid pressurized and delivered from the high-pressure pump 66 or the pressurized fluid stored in the buffer 71. Where the low-pressure pump 64 and the low-pressure pump motor drive circuit 184 are both defective, the high-pressure pump 66 is selectively turned on and of f irrespective of whether the desired wheel brake cylinder pressure Pwcnm is higher or lower than 4 MPa. Namely, the high-pressure pump 66 is operated in place of the defective low-pressure pump 64 even when the desired wheel brake cylinder pressure Pwcnm is lower than 4 MPa, so that the actual wheel brake cylinder pressure Pwcac is controlled to the desired value Pwcnm. In this respect, it is noted that the drive force of the high-pressure pump 66 is not controlled to a value corresponding to the desired wheel brake cylinder pressure Pwcnm, but is selectively turned on and off, and the pressure of the fluid pressurized by the high-pressure pump 66 is controlled by the solenoid-operated pressure control valves 76–90 before it is applied to the wheel brake cylinders 20–26, so that the actual wheel brake cylinder pressure Pwcac is controlled to the desired value Pwcnm. Since steps S8–S12 are similar to steps S39–S43 which have been described, no explanation of steps S8–S12 is deemed necessary.

There will next be described an operation of the braking system where the high-pressure pump system is defective.

Where the high-pressure pump system is defective while the low-pressure pump system is normal, a negative decision (NO) is obtained in step S4 while an affirmative decision (YES) is obtained in step S13, and the control flow goes to step S14 in which the linear valve control is effected in the same manner as in step S38. Step S14 is followed by step S15 to determine whether the fluid pressure in any one of the wheel brake cylinders 20–26 is required to be increased. Step S14 is identical with step S33. If an affirmative decision (YES) is obtained in step S15, the control flow goes to step S16 to determine whether the pump pressure Pp is lower than 10 MPa. Where the low-pressure pump 64 is normal, it is operated while the desired wheel brake cylinder pressure Pwcnm is 4 MPa or lower, so that the wheel brake cylinders 20–26 are operated by the fluid pressurized by the low-pressure pump 64. Where the high-pressure pump 66 is defective and only the low-pressure pump 64 is available for activating the wheel brake cylinders 20–26, the upper limit delivery pressure of the low-pressure pump 64 is raised from 4 MPa up to 10 MPa, so that the low-pressure pump 64 is used even where the desired wheel brake cylinder pressure Pwcnm is in a range between 4 MPa and 10 MPa in which the high-pressure pump 66 would be operated if it were normal. In the present arrangement, the linear valve control is effected where the high-pressure pump system is defective, irrespective of whether the desired wheel brake cylinder pressure Pwcnm is higher or lower than 4 MPa, so that the pressure of the fluid pressurized and delivered by the low-pressure pump 64 is controlled by the solenoid-operated pressure control valves 76–90 before the fluid pressure is applied to the wheel brake cylinders.

When the pump pressure Pp is lower than 10 MPa, an affirmative decision (YES) is obtained in step S16, and the control flow goes to step S17 to turn on the low-pressure pump. Step S17 is followed by step S18 to determine whether the desired wheel brake cylinder pressure Pwcnm is equal to or lower than 10 MPa. If the desired wheel brake cylinder pressure Pwcnm is equal to 10 MPa or lower, an anti-lock braking pressure control operation of the braking system is permitted. If the desired pressure Pwcnm is high than 10 MPa, the anti-lock braking pressure control operation is inhibited. Where the high-pressure pump system is defective, the upper limit of the delivery pressure of the low-pressure pump 64 is increased from 4 MPa to 10 MPa as described above. However, the anti-lock braking pressure control operation cannot be performed with the low-pressure pump 64 when the desired wheel brake cylinder pressure Pwcnm is higher than 10 MPa. The RAM 178 has an ANTI-LOCK PRESSURE CONTROL PERMIT flag. When this flag is set at "1", the anti-lock braking pressure control operation is permitted. When the flag is reset to "0", the anti-lock braking pressure control operation is inhibited. When the anti-lock braking pressure control operation is required to be performed according to the anti-lock braking pressure control program indicated above, the ANTI-LOCK PRESSURE CONTROL PERMIT flag is checked. If the flag is set at "1", the operation according to the anti-lock braking pressure control program is permitted. If the flat is set at "0", the operation is inhibited.

If the desired wheel brake cylinder pressure Pwcnm is not higher than 10 MPa, an affirmative decision (YES) is obtained in step S18, and the control flow goes to step S19 in which the ANTI-LOCK PRESSURE CONTROL PERMIT flag is set to "1". If a negative decision (NO) Is obtained in step S18, the control flow goes to step S20 in which the flag is reset to "0". It is noted that the flag is set to "1" when the computer 172 is initially turned on.

When the pump pressure Pp has been raised above 10 MPa as a result of an operation of the low-pressure pump 64, a negative decision (NO) is obtained in step S16, and the control flow goes to step s21 to turn off the low-pressure pump 64. Since the low-pressure pump 64 is designed to be operated when the desired wheel brake cylinder pressure Pwcnm is 4 MPa or lower, a continuous operation of the low-pressure pump 64 with its delivery pressure exceeding 10 MPa is not desirable. Further, the low-pressure pump 64 is not capable of pressurizing the fluid to a level considerably higher than 10 MPa. For this reason, the low-pressure pump 64 is turned off when the pump pressure Pp has reached 10 MPa. Further, when the desired wheel brake cylinder pressure Pwcnm is relatively low, the supply of the pressurized fluid from the pump device 32 to the wheel brake cylinders 20–26 is not necessary and possible after the pressure increase control valves 76, 80, 84, 88 have been closed. If the low-pressure pump 64 is continuously operated in this condition, the pump pressure Pp will exceed 10 MPa, resulting in the negative decision (NO) in step S16, so that the low-pressure pump 64 is turned off.

The low-pressure pump 64 is also turned off in step S21 when a negative decision (NO) is obtained in step S15, that is, when none of the fluid pressures of the wheel brake cylinders 20–26 are required to be increased where the high-pressure pump system is found detective. Thus, the low-pressure pump 64 is turned off when the pump pressure Pp has been raised to 10 MPa, or when the supply of the pressurized fluid from the pump device 32 to the wheel brake cylinders 20–26 is not necessary. According to this arrangement, the electric motor 60 is protected from an overload when the low-pressure pump 64 is operated while the desired wheel brake cylinder pressure Pwcnm is higher than 4 MPa.

When the brake pedal 36 has been returned to the non-operated position, a negative decision (NO) is obtained in step S1, and the control flow goes to step S23 in which the terminating processing is effected. For instance, the terminating processing includes: turning off the low-pressure and high-pressure pumps 64, 66 (electric motors 60, 62); setting the ANTI-LOCK PRESSURE CONTROL PERMIT flag in the RAM 178; opening the master cylinder cut-off valves 44, 46; closing the pressure increase control valves 76, 80, 84, 88; closing the pressure reduction control valves 78, 82; and opening the pressure reduction control valves 86, 90. Since the high-pressure pump 66 is a gear pump, any amount of the fluid remaining in the buffer 71 is returned to the high-pressure pump 66 which has been turned off, so that the pump 66 is operated in the reverse direction or the returned fluid leaks from the pump 66, whereby the fluid is returned from the buffer 71 back to the master reservoir 39. Accordingly, the fluid is not left in the buffer 71.

It will be understood from the foregoing description of this embodiment of the invention that a portion of the control device 170 assigned to implement step S31 and the ROM 176 storing the data map representative of the operating characteristics of the pumps 64, 66 cooperate to constitute a pump selecting portion for selecting one of the pumps 64, 66 which is to be operated.

It will also be understood that a portion of the control device 170 assigned to implement steps S16 and S17 constitutes a normal-pump operating-range changing portion for changing a range of the delivery pressure of the normally functioning low-pressure pump 64 in which the low-pressure pump 64 is permitted to operate, and further constitutes a low-pressure-pump upper limit increasing portion for increasing the upper limit of the delivery pressure of the low-pressure pump 64 below which the low-pressure pump 64 is permitted to operate.

It will further be understood that a portion of the control device 170 assigned to implement step S34 constitutes a low-pressure-pump drive force controlling portion for controlling the drive force of the low-pressure pump 64, and that a portion of the control device 170 assigned to implement steps S39–S43 constitutes a high-pressure pump on/off controlling portion for selectively turning on and off the high-pressure pump 66.

It will also be understood that a portion of the control device 170 assigned to implement steps S8–S12 constitutes a normal-pump operating-range changing portion for changing a range of the delivery pressure of the normally functioning high-pressure pump 66 in which the high-pressure pump 66 is permitted to operate, and further constitutes a low-pressure-pump failure high-pressure pump controlling portion for controlling the high-pressure pump 66 when the low-pressure pump 64 is defective.

It will further be understood that a portion of the control device 170 assigned to implement step S72 constitutes a low-pressure-pump-failure & normal-low-pressure-pump driver high-pressure pump controlling portion for controlling the high-pressure pump 66 when the low-pressure pump 64 is defective while the driver circuit 184 for driving the electric motor 60 for the low-pressure pump 64 is normal.

It will also be understood that a portion of the control device 170 assigned to implement step S21 constitutes a low-pressure pump turning-off portion for turning off the low-pressure pump 64, and that a portion of the control device 170 assigned to implement step S14 constitutes a high-pressure-pump-failure pressure control valve controlling portion for controlling the solenoid-operated pressure increase control valves 76, 80, 84, 88 and the solenoid-operated pressure reduction control valves 78, 82, 86, 90 when the high-pressure pump 66 is defective.

It will further be understood that a portion of the control device 170 assigned to implement step S7 constitutes a low-pressure-pump-failure pressure control valve controlling portion for controlling the solenoid-operated pressure increase control valves 76, 80, 84, 88 and the solenoid-operated pressure reduction control valves 78, 82, 86, 90 when the low-pressure pump 64 is defective. it will also be understood that the above-indicated normal-pump operating-range changing portion, low-pressure-pump upper limit increasing portion, low-pressure-pump failure high-pressure pump controlling portion and low-pressure-pump failure & normal-low-pressure-pump-driver high-pressure pump controlling portion cooperate to constitute a control changing portion which is operated in response to detection of a failure of one of the low-pressure and high-pressure pumps 64, 66, to change a manner of controlling the other of those two pumps 64, 66 so that at least a portion of an operating characteristic of the above-indicated defective one of the pumps 64, 66 is compensated for by the changed manner of controlling the other pump.

It will further be understood that the pump pressure sensor 74 constitutes a buffer upper-threshold-pressure detecting device for detecting the upper threshold of the fluid pressure in the buffer 71, and a buffer lower-threshold-pressure detecting device for detecting the lower threshold of the fluid pressure in the buffer 71, and that the pump pressure sensor 74 cooperates with a portion of the control device 170 assigned to implement steps S42 and S43 to constitute a high-pressure-pump turning-off portion for turning off the high-pressure pump 66, and cooperates with a portion of the control device assigned to implement steps S40 and S41 to constitute a high-pressure-pump turning-on portion for turning on the high-pressure pump 66.

It will also be understood that the above-indicated buffer upper-threshold-pressure detecting device, buffer low-threshold-pressure detecting device, high-pressure-pump turning-off portion and high-pressure-pump turning-on portion cooperate to constitute a buffer pressure control portion for controlling the pressure of the fluid accommodated in the buffer 71.

It will further be understood that the pump pressure sensor 74 and a portion of the control device 170 assigned to implement steps S4 and S5 constitutes a low-pressure-pump failure detecting device for detecting a failure of the low-pressure pump 64, and that the pump pressure sensor 74 and a portion of the control device 170 assigned to implement step S13 cooperate to constitute a high-pressure-pump failure detecting device for detecting a failure of the high-pressure pump 66.

In the illustrated embodiment which has been described, the electric motor 62 for the high-pressure pump 66 is controlled through the driver circuit 184 for the electric motor 62 so that the drive force of the high-pressure pump 66 is controlled depending upon the desired wheel brake cylinder pressure Pwcnm, irrespective of whether the desired wheel brake cylinder pressure Pwcnm is higher or lower than a predetermined threshold of 4 MPa, where the low-pressure pump 64 is defective while the driver circuit 184 for the electric motor 60 for the low-pressure pump 64 is normal. In this case, however, the electric motor 62 for the high-pressure pump 66 may be controlled through the driver circuit 184 for the electric motor 60 so that the drive force of the high-pressure pump 66 is controlled depending upon the desired wheel brake cylinder pressure Pwcnm only while the desired wheel brake cylinder pressure Pwcnm is lower than the predetermined threshold (4 MPa), and the electric motor 62 is selectively turned on and off to selectively turn on and off the high-pressure pump 66 so that the fluid pressurized by the high-pressure pump 66 is stored in the buffer 71 and is at the same time supplied to the wheel brake cylinders 20–26 with its pressure being controlled by the solenoid-operated pressure control valves 76–90, while the desired wheel brake cylinder pressure Pwcnm is higher than the predetermined threshold.

Although the illustrated embodiment uses the same desired wheel brake cylinder pressure Pwcnm for all of the four wheel brake cylinders 20, 22, 24, 26, two or more wheel brake cylinder pressure values Pwcnm may be used for controlling the fluid pressures in the four wheel brake cylinders 20–26. For instance, a first desired wheel brake cylinder pressure is used commonly for the two front wheel brake cylinders 20, 22, while a second desired wheel brake cylinder pressure different from the first desired wheel brake cylinder pressure is used commonly for the two rear wheel brake cylinders 24, 26. Alternatively, a first desired wheel brake cylinder pressure is used commonly for the two front wheel brake cylinders 20, 22, while a second and a third desired wheel brake cylinder pressure different from the first desired wheel brake cylinder pressure are used for the respective rear left and right wheel brake cylinders 24, 26. Further alternatively, four desired wheel brake cylinder pressures are used for the respective four wheel brake cylinders 20, 22, 24, 26. In either one of those cases, one of the desired wheel brake cylinder pressures which is lower than the predetermined threshold may be established by controlling the drive force of the low-pressure pump 64, and the other desired wheel brake cylinder pressures are established by controlling the pressure control valves 76–90. Alternatively, all of the desired wheel brake cylinder pressures may be established by controlling the pressure control valves 76–90 even while at least one of the desired wheel brake cylinder pressures is lower than the predetermined threshold. Similar arrangements are available where the drive force of the high-pressure pump 66 is controlled depending upon the desired wheel brake cylinder pressures. Where the high-pressure pump 66 is selectively turned on and off, all of the desired wheel brake cylinder pressures are established by controlling the pressure control valves 76–90.

The illustrated embodiment is adapted such that the low-pressure pump 64 is held operated even while the high-pressure pump 66 is operated with the desired wheel brake cylinder pressure Pwcnm being higher than 4 MPa. In this case, however, the low-pressure pump 64 may be held off. Alternatively, both the low-pressure pump 64 and the high-pressure pump 66 may be operated while the desired wheel brake cylinder pressure Pwcnm is in the neighborhood of the threshold value of 4 MPa, for instance, in a range between 3.5 MPa and 4.5 MPa. In this specific example, the high-pressure pump 66 is turned on when the desired wheel brake cylinder pressure Pwcnm has exceeded 4 MPa while the low-pressure pump 64 is in operation, but the low-pressure pump 64 is held operated until the desired wheel brake cylinder pressure has exceeded 4.5 MPa (normal threshold value +0.5 MPa). Similarly, the low-pressure pump 66 is turned on when the desired wheel brake cylinder pressure has been lowered below 4 MPa while the high-pressure pump 66 is in operation, but the high-pressure pump 66 is held operated until the desired wheel brake cylinder pressure has been lowered below 3.5 MPa (normal threshold value −0.5 MPa). According to this arrangement, the pump which has been operated is continuously operated until the pump which has been turned on has been brought into a steady operating state, so that the delivery of the pump device 32 can be stabilized when the desired wheel brake cylinder pressure changes across the threshold value of 4 MPa. In an alternative arrangement, the high-pressure pump 66 is turned on when the desired wheel brake cylinder pressure has exceeded 4 MPa, and the low-pressure pump 64 is held operated for a predetermined additional time. Similarly, the low-pressure pump 64 is turned on when the desired wheel brake cylinder pressure has been lowered below 4 MPa, and the high-pressure pump 66 is held operated for a predetermined additional time.

In the illustrated embodiment, the electric current to be applied to the coil 156 when the normally open pressure reduction control valves 86, 90 is closed is controlled depending upon the desired wheel brake cylinder pressure Pwcnm so that the control valves 86, 90 are held closed with high stability. However, the electric current may be maximized, irrespective of the desired wheel brake cylinder pressure Pwcnm, so that the control vales 86, 90 are held closed with higher stability.

While the presently preferred embodiment of the present invention has been described above for illustrative purpose only, it is to be understood that the invention may be embodied with various changes and modifications such as those described in the SUMMARY OF THE INVENTION, which may occur to those skilled in the art.

What is claimed is:

1. A pump device including a plurality of pumps having respective different operating characteristics, and a pump control device for controlling said plurality of pumps, wherein said pump control device comprises a control changing portion operable in response to detection of a failure of at least one of said plurality of pumps, for changing a manner of controlling at least one of the other of said plurality of pumps such that at least a portion of the operating characteristic of each of said at least one of said plurality of pumps is compensated for by the changed manner of controlling said at least one of said other of said plurality of pumps.

2. A pump device according to claim 1, wherein said pump control device further comprises a pump failure detecting device for detecting said failure of said at least one of said plurality of pumps, and said control changing portion operates in response to detection of said failure by said pump failure detecting device.

3. A pump device according to claim 1, wherein said pump control device further comprises a pump selecting portion operable when said plurality of pumps are normal, for selecting at least one of said plurality of pumps which should be operated, on the basis of at least one of a desired delivery pressure and a desired delivery flow rate of the pump device, and on the basis of information defining an operating range in which each of said plurality of pumps should be operated, which operating range is determined by a capacity of said each pump, and wherein said control changing portion changes the operating range of each of said at least one of said other of said plurality of pumps.

4. A pump device according to claim 3, wherein said plurality of pumps include a low-pressure pump and a high-pressure pump having a maximum delivery pressure higher than that of said low-pressure pump, and said operating range of each of said low-pressure and high-pressure pumps is defined by a desired value of the delivery pressure of the pump device, and wherein said control changing portion comprises a low-pressure-pump upper limit increasing portion for increasing an upper limit of a delivery pressure of said low-pressure pump to thereby change the operating range of said low-pressure pump when said high-pressure pump becomes defective, such that said upper limit is higher while said high-pressure pump is defective than while said high-pressure pump is not defective.

5. A pump device according to claim 4, wherein said pump control device commands said low-pressure pump to be held operated even in the absence of a command to increase a delivery pressure of the pump device while said high-pressure pump is normal, said pump control device further comprising a low-pressure turning-off portion operable when said high-pressure pump becomes defective, for turning off said low-pressure pump in the absence of said command, at least when said desired value of the delivery pressure of said pump device is in a range between two values of said upper limit of the delivery pressure of said low-pressure pump before and after said upper limit has been changed by said low-pressure-pump upper limit increasing portion.

6. A pump device according to claim 1, wherein said plurality of pumps include a low-pressure pump and a high-pressure pump having a maximum delivery pressure higher than that of said low-pressure pump, and said pump control device further comprises a low-pressure-pump drive force controlling portion for controlling a drive force of said low-pressure pump to a value corresponding to a desired value of a delivery pressure of the pump device, and high-pressure-pump on/off controlling portion for selectively turning on and off said high-pressure pump.

7. A pump device according to claim 1, wherein said plurality of pumps include a low-pressure pump and a high-pressure pump having a maximum delivery pressure higher than that of said low-pressure pump, and said pump control device further comprises a low-pressure-pump drive force controlling portion for controlling a drive force of said low-pressure pump to a value corresponding to a desired value of a delivery pressure of the pump device, and a low-pressure-pump-failure high-pressure pump controlling portion for controlling said high-pressure pump while said low-pressure pump is defective, so that a desired value of a delivery pressure of the pump device is available based on a delivery pressure of said high-pressure pump.

8. A pump device according to claim 1, wherein said plurality of pumps include a low-pressure pump and a high-pressure pump having a maximum delivery pressure higher than that of said low-pressure pump, and said pump control device further comprises a low-pressure-pump drive force controlling portion for controlling a drive force of said low-pressure pump to a value corresponding to a desired value of a delivery pressure of the pump device and a high-pressure-pump on/off controlling portion for selectively turning on and off said high-pressure pump, and said control changing portion comprises a low-pressure-pump-failure & normal-low-pressure-pump-driver high-pressure pump controlling portion for commanding said low-pressure-pump drive force controlling portion to control the drive force of said high-pressure pump for thereby causing said high-pressure pump to perform a function of said low-pressure pump when said low-pressure pump is defective while said low-pressure-pump drive force controlling portion is normal.

9. A hydraulic pressure control system including a pump device as defined in claim 1, a hydraulically operated device and a pressure control valve device interconnected between said pump device and said hydraulically operated device and operable to control a delivery pressure of said pump device such that the controlled delivery pressure is applied to said hydraulically operated device.

10. A hydraulic pressure control system according to claim 9, wherein said plurality of pumps include a low-pressure pump and a high-pressure pump having a maximum delivery pressure higher than that of said low-pressure pump, and said pump control device comprises (a) a pump selecting portion operable when said plurality of pumps are normal, for selecting at least one of said plurality of pumps which should be operated, on the basis of at least one of a desired delivery pressure and a desired delivery flow rate of the pump device, and on the basis of information defining an operating range in which each of said plurality of pumps should be operated, which operating range is determined by a capacity of said each pump, and (b) a low-pressure-pump drive force controlling portion for controlling a drive force of said low-pressure pump to a value corresponding to a desired value of the delivery pressure of the pump device, and wherein said control changing portion comprises a low-pressure-pump upper limit increasing portion for increasing an upper limit of a delivery pressure of said low-pressure pump to thereby change the operating range of said low-pressure pump when said high-pressure pump becomes defective, such that said upper limit is higher while said high-pressure pump is defective than while said high-pressure pump is not defective, said pump control device further comprising a high-pressure-pump failure pressure control valve controlling portion operable when said high-pressure pump becomes defective, for commanding said pressure control valve device to operate, in place of said low-pressure-pump drive force controlling portion, to control the delivery pressure of said low-pressure pump to be applied to said hydraulically operated device, at least when said desired value of the delivery pressure of said pup device is in a range between two values of said upper limit of the delivery pressure of said low-pressure pump before and after said upper limit has been increased by said low-pressure-pump upper limit increasing portion.

11. A hydraulic pressure control system including a pump device as defined in claim 7, a hydraulically operated device and a pressure control valve device interconnected between said pump and device and said hydraulically operated device and operable to control a delivery pressure of said pump device such that the controlled delivery pressure is applied to said hydraulically operated device.

12. A hydraulic pressure control system according to claim 11, wherein said pump control device further comprises a low-pressure-pump-failure pressure control valve controlling portion operable at least when said low-pressure-pump-failure high-pressure-pump controlling portion is in operation, for commanding said pressure control valve device to control the delivery pressure of said high-pressure pump to be applied to said hydraulically operated device.

13. A hydraulic pressure control system according to claim 9, where said plurality of pumps include a low-pressure pump and a high-pressure pump having a maximum delivery pressure higher than that of said low-pressure pump, and said pump device includes a buffer connected to said high-pressure pump for accommodating a working fluid pressurized by said high-pressure pump.

14. A hydraulic pressure control system according to claim 13, wherein said high-pressure pump is of an internal fluid leakage type which permits the working fluid remaining in said buffer to be discharged due to an internal leakage of the working fluid through the internal fluid leakage type high-pressure pump after an operation of said hydraulically operated device.

15. A hydraulic pressure control system according to claim 13, wherein said pump control device further comprises a buffer pressure controlling portion for turning off said high-pressure pump before said buffer is filled with the working fluid pressurized by said high-pressure pump, and turning on said high-pressure pump before said buffer has become empty.

16. A hydraulic pressure control system according to claim 15, wherein said buffer pressure controlling portion comprises high-pressure-pump turning-off portion for turning off said high-pressure pump when the pressure of said working fluid stored in said buffer as a result of an operation of said high-pressure pump has been increased to a predetermined upper threshold which is lower than a highest pressure of the working fluid that can be stored in said buffer.

17. A hydraulic pressure control system according to claim 16, wherein said high-pressure-pump turning-off portion comprises a buffer upper-threshold-pressure detecting device for detecting that the pressure of the working fluid stored in said buffer has been increased to said predetermined upper threshold.

18. A hydraulic pressure control system according to claim 15, wherein said buffer pressure controlling portion comprises a high-pressure-pump turning-on portion for turning on said high-pressure pump when the pressure of the working fluid stored in said buffer after said high-pressure pump is turned off has been reduced to a predetermined lower threshold which is higher than a lower limit pressure of the working fluid that can be stored in said buffer.

19. A hydraulic pressure control system according to claim 18, wherein said high-pressure pump turning-on portion comprises a buffer lower-threshold-pressure detecting device for detecting that the pressure of the working fluid stored in said buffer has been reduced to said predetermined lower threshold.

20. A hydraulic pressure control system according to claim 13, wherein said pump device further includes a pressure relief valve connected to said high-pressure pump in parallel with said hydraulically operated device.

21. A hydraulic pressure control system according to claim 20, wherein said pump control device includes a high-pressure-pump turning-off portion operable when said pressure relief valve is opened, for turning off said high-pressure pump.

22. A hydraulic pressure control system according to claim 9, wherein said hydraulically operated device includes a hydraulically operated brake having a wheel brake cylinder which is hydraulically activated to brake a wheel of a vehicle.

23. A hydraulic pressure control system according to claim 22, wherein said buffer has a volume not larger than 10 cc.

* * * * *